US011327256B2

(12) United States Patent
Oomori et al.

(10) Patent No.: US 11,327,256 B2
(45) Date of Patent: May 10, 2022

(54) OPTICAL RECEIVER MODULE AND PACKAGE FOR OPTICAL RECEIVER MODULE

(71) Applicant: Sumitomo Electric Industries, Ltd., Osaka (JP)

(72) Inventors: Hiroyasu Oomori, Osaka (JP); Hiroshi Hara, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 17/163,012

(22) Filed: Jan. 29, 2021

(65) Prior Publication Data

US 2021/0247576 A1 Aug. 12, 2021

(30) Foreign Application Priority Data

Feb. 6, 2020 (JP) .............................. JP2020-019073

(51) Int. Cl.
*G02B 6/42* (2006.01)
*H04B 10/67* (2013.01)
*G02B 6/293* (2006.01)

(52) U.S. Cl.
CPC ......... *G02B 6/4248* (2013.01); *G02B 6/2938* (2013.01); *G02B 6/4206* (2013.01); *G02B 6/4215* (2013.01); *H04B 10/67* (2013.01); *G02B 6/4246* (2013.01)

(58) Field of Classification Search
CPC .. G02B 6/4248; G02B 6/2938; G02B 6/4206; G02B 6/4215; G02B 6/4246; G02B 6/4274; G02B 6/428; H04B 10/67; H01L 23/552; H01L 25/165; H01L 25/167
See application file for complete search history.

(56) References Cited

U.S. PATENT DOCUMENTS

| 6,036,375 | A | 3/2000 | Yanagisawa et al. | |
|---|---|---|---|---|
| 6,992,250 | B2 * | 1/2006 | Kubota | H01L 23/047 |
| | | | | 174/549 |
| 9,853,414 | B2 * | 12/2017 | Wang | H01S 5/0235 |
| 10,484,121 | B2 * | 11/2019 | Nakayama | H04J 14/02 |
| 10,727,953 | B2 * | 7/2020 | Mii | H04B 10/506 |
| 10,928,600 | B2 * | 2/2021 | Liu | H01L 23/057 |
| 11,012,042 | B2 * | 5/2021 | Nakayama | H05K 1/181 |
| 2005/0207092 | A1 | 9/2005 | Kubota et al. | |
| 2015/0365176 | A1 * | 12/2015 | Kawamura | H04B 10/676 |
| | | | | 29/825 |

* cited by examiner

*Primary Examiner* — John Bedtelyon
(74) *Attorney, Agent, or Firm* — Baker Botts L.L.P.; Michael A. Sartori

(57) ABSTRACT

A package for optical receiver module includes a conductive housing and a feedthrough. The conductive housing includes a first sidewall having an optical port for receiving an optical signal along an optical axis, a second sidewall separated from the first sidewall along the optical axis, and an interior space for housing a photodetector. The feedthrough includes first to third layers extending from the second sidewall to an opposite direction of the first sidewall, and the third layer is provided between the first and second layers. The feedthrough includes first to fourth wirings, a grounding wiring, and a plurality of first conductive cells. The first and second wirings face the interior space. The third wirings, the fourth wiring, the grounding wiring are formed in the first layer or the second layer. The plurality of first conductive cells are arranged in the third layer, and are electrically connected to the grounding wiring.

11 Claims, 23 Drawing Sheets

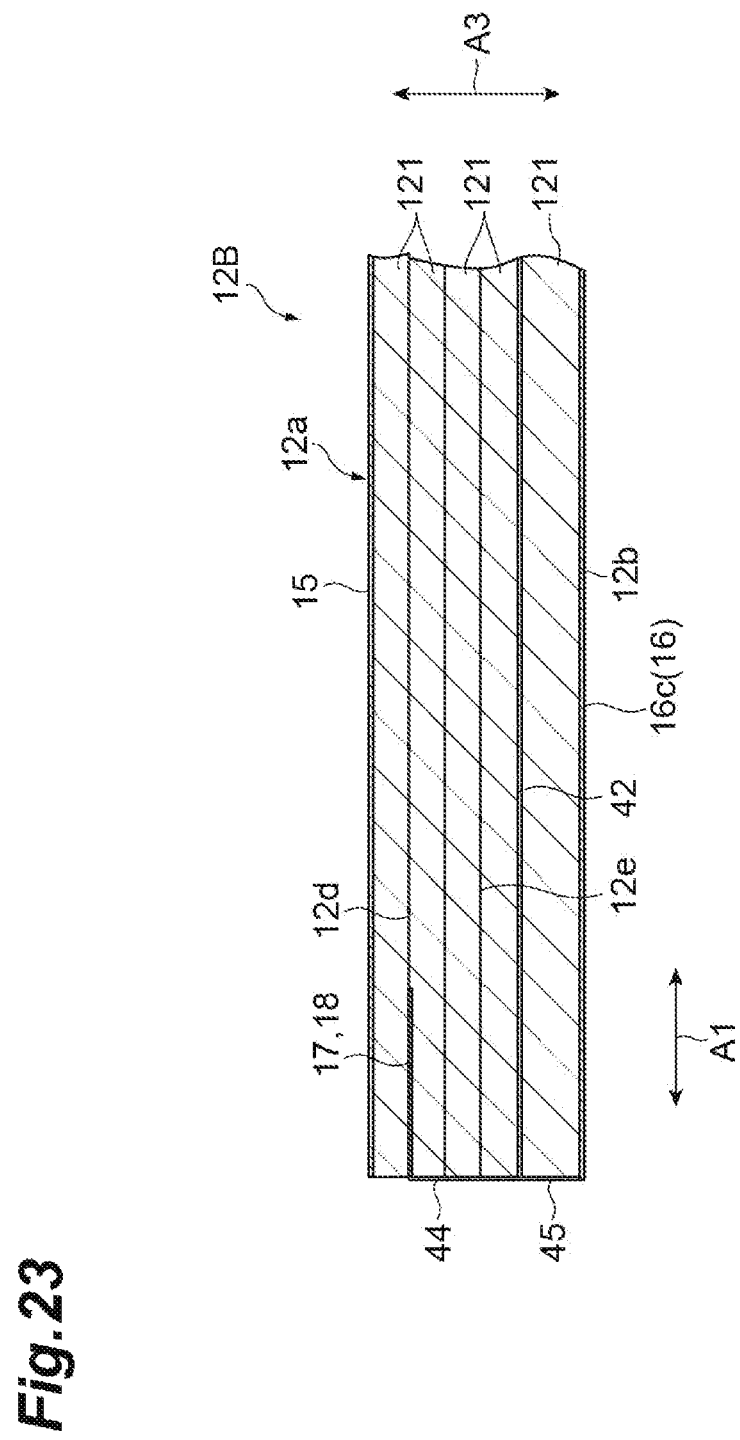

OPTICAL RECEIVER MODULE AND PACKAGE FOR OPTICAL RECEIVER MODULE

CROSS REFERENCE TO RELATED APPLICATIONS

This application is based upon and claims the benefit of priority from Japanese Patent Application No. 2020-019073, filed on Feb. 6, 2020, the entire contents of which are incorporated herein by reference.

TECHNICAL FIELD

The present disclosure relates to a package for optical receiver module and an optical receiver module.

BACKGROUND

U.S. Application Publication No. 2005/0207092 discloses a package for housing electronic components. The package includes a base body, a frame body, and input/output terminals. An upper principal surface of the base body is provided with a placement portion on which electronic components are placed. The frame body is disposed on the upper principal surface of the base body, and surrounds the placement portion. A lid body is disposed on a top surface of the frame body. Each of the input/output terminals has a line conductor that electrically connects the inside and the outside of the frame body. The line conductor is a strip line or a micro-strip line. The base body, the frame body, and the lid body are composed of metal. The input/output terminals are composed of insulating materials.

U.S. Pat. No. 6,036,375 discloses a package for housing an optical semiconductor device. The package includes a base body, a frame body, and a lid member, and houses the optical semiconductor device. An upper surface of the base body is provided with a mounting portion on which the optical semiconductor device is mounted. The optical semiconductor device is electrically connected to an external electrical circuit located on the outer side of the upper surface of the base body via an external lead terminal. The frame body is attached to the base body, and surrounds the mounting portion. The frame body has a through-hole in which an optical fiber is fixed. The lid member is attached to an upper face of the frame body. The base body, the frame body, and the lid member are composed of metal.

SUMMARY

The present disclosure provides a package for optical receiver module. The package for the optical receiver module includes a conductive housing having a first sidewall, a second sidewall, and an interior space, the first sidewall being provided with an optical port configured to receive an optical signal along an optical axis, the second sidewall being separated from the first sidewall in a direction of the the optical axis, the interior space being defined between the first sidewall and the second sidewall, the interior space being configured to house a photodetector which converts the optical signal into an electrical signal; and a feedthrough having a first layer, a second layer, and a third layer, the first layer and the second layer extending from the second sidewall to an opposite side of the first sidewall, the third layer being disposed between the first layer and the second layer. The feedthrough includes a dielectric material, a plurality of first wirings having at least one of a monitor wiring or a power wiring, the plurality of the first wirings being configured to face the interior space, a second wiring configured to face the interior space and configured to transmit the electrical signal, a plurality of third wirings formed in the first layer, the plurality of the third wirings being arranged along a side direction crossing the optical axis, the plurality of the third wirings being electrically connected to the plurality of first wirings, a fourth wiring formed in the second layer, the fourth wiring being electrically connected to the second wiring and configured to transmit the electrical signal transmitted by the second wiring, a grounding wiring formed in either of the first layer or the second layer, and a plurality of first conductive cells formed in the third layer, the plurality of the first conductive cells being arranged along the side direction, the plurality of the first conductive cells being equally spaced. The plurality of the first conductive cells are electrically connected to the grounding wiring.

The present disclosure provides a package for optical receiver module. The package for the optical receiver module includes a conductive housing, a feedthrough, a plurality of first wirings, a second wiring, a plurality of third wirings, a fourth wiring, a grounding wiring, and a plurality of first conductive cells. The conductive housing has a first sidewall, a second sidewall, and an interior space. The first sidewall is provided with an optical port for receiving an optical signal along an optical axis. The second sidewall is separated from the first sidewall in a direction of the optical axis. The interior space is defined between the first sidewall and the second sidewall. The interior space is configured to house a photodetector which converts the optical signal into an electrical signal. The feedthrough has a first layer, a second layer, and a third layer. The first and second layers extend from the second sidewall to an opposite side of the first sidewall. The third layer is disposed between the first layer and the second layer. The feedthrough includes a dielectric material. The plurality of first wirings are configured to face the interior space, and include at least one of a monitor wiring or a power wiring. The second wiring is configured to face the interior space. The second wiring is configured to transmit the electrical signal. The plurality of the third wirings are formed in the first layer and electrically connected to the plurality of the first wirings. The plurality of the third wirings are arranged along a side direction crossing the optical axis. The fourth wiring is formed in the second layer and electrically connected to the second wiring. The fourth wiring is configured to transmit the electrical signal transmitted by the second wiring. The grounding wiring is formed in at least one of the first layer and the second layer. The plurality of the first conductive cells are formed in the third layer, and are arranged along the side direction at regular intervals. The plurality of the first conductive cells are electrically connected to the grounding wiring.

BRIEF DESCRIPTION OF THE DRAWINGS

FIG. 4 shows only a part of a feedthrough protruding from an end wall in the enlarged view.

FIG. 8 shows a view of a part of feedthrough protruding from an end wall viewed from a second layer.

FIG. 10A shows an equivalent circuit of an ordinary transmission line along a traveling direction of an electromagnetic wave.

FIG. 10B shows an equivalent circuit of a transmission line when a metamaterial structure is placed in the middle.

FIG. 23 is a cross-sectional view taken along XXIII-XXIII line of FIG. 22.

DETAILED DESCRIPTION

Figure 1:
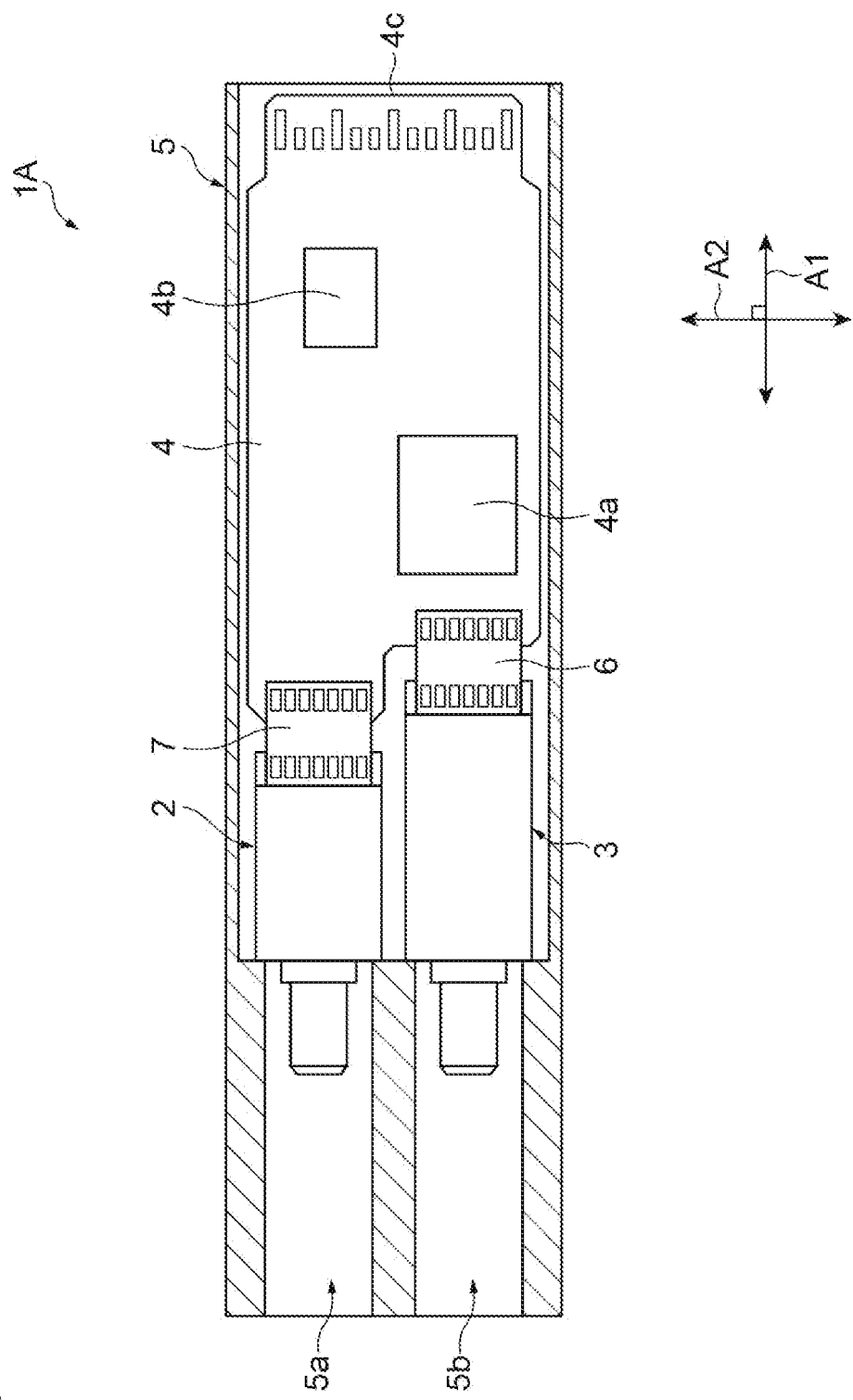
FIG. 1 is a plan view schematically showing a configuration of an optical transceiver used for optical communication.

Problem to be Solved by the Disclosure

Recently, miniaturization of optical transceivers has progressed with increasing the transmission speed in the optical communication. In the optical transceiver, for example, an optical transmitter module, an optical receiver module, and a circuit board electronically coupled to these modules are contained within a single housing. The optical transmitter module, for example, contains a light-emitting device such as a laser-diode, for example. The optical receiver module, for example, contains a photodetector such as a photodiode, for example. Each of the optical transmitter module and the optical receiver module has a package for the optical transmitter module and a package for the optical receiver module, respectively. The optical transmitter module outputs an optical signal. An optical signal is inputted to the optical receiver module. When a direction in which the optical signal is input or output in each package is defined as an optical axis direction, these packages are arranged adjacently in a direction crossing the optical axis direction in front of the circuit board. The package for the optical receiver module has a conductive housing and a dielectric feedthrough. The housing has an interior space and houses the photodetector in the interior space. The feedthrough is provided from inside (the interior space) to outside of the housing. The feedthrough is provided with a plurality of wirings for conducting the inside and the outside of the housing. A driving circuit for driving the light-emitting device of the optical transmitter module is arranged outside the optical transmitter module, for example, on the above-mentioned circuit board.

In the optical transceiver having such a configuration, when the transmission speed of the optical communication increases, an electromagnetic wave noise having a higher frequency is generated from a wiring between the driver circuit and the optical transmitter module. For example, as a frequency of the electrical signal becomes high, an electromagnetic wave becomes easy to be radiated from a signal wiring which transmits the electrical signal, and the electromagnetic wave radiated from the signal wiring induces noise in another signal wiring by electromagnetic inductions, resulting a deterioration of a signal-to-noise ratio of an electrical signal transmitting in another signal wiring. In this way, this electromagnetic wave noise causes cross-talk due to electromagnetic interference on the received signal in the optical receiver module located next to the optical transmitter module. As described above, in the package for the optical receiver module, the dielectric feedthrough is provided penetrating through a part of the conductive housing. Through this feedthrough, the electromagnetic wave noise tends to penetrate into the housing of optical receiver module.

DESCRIPTION OF THE EMBODIMENTS OF THE DISCLOSURE

Details of Embodiments of the Present Disclosure

Specific examples of an optical receiver module and a package for an optical receiver module according to an embodiment of the present disclosure will be described below with reference to the drawings. The present invention is not limited to the examples, but is indicated by the appended claims and is intended to include all modifications within the meaning and scope equivalent to the appended claims. In the following description, the same elements will be designated by the same reference numerals in the description of the drawings, and redundant description will be omitted.

FIG. 1 is a plan view schematically showing a configuration of an optical transceiver 1A used for optical communication. The optical transceiver 1A includes an optical receiver module 2, an optical transmitter module 3, a circuit board 4, and a housing 5. The optical receiver module 2 includes a package for the optical receiver module according to an embodiment of the present disclosure. The housing 5 is a rectangular parallelepiped hollow container extending along a direction A1 which is an optical axis direction. The housing 5 has a rectangular parallelepiped outer shape which is elongated in the direction A1, and has an interior space inwardly. The housing 5 accommodates the optical receiver module 2, the optical transmitter module 3, and the circuit board 4 in the interior space. A receiving port 5a and a transmitting port 5b are provided at one end of the housing 5 in the direction A1. An optical connector attached to a distal end of a receiving optical fiber is inserted into or removed from the receiving port 5a. An optical connector attached to a distal end of a transmitting optical fiber is inserted into or removed from the transmission port 5b. An opening is provided at the other end of the the housing 5 in the direction A1, and a connecting terminal 4c of the circuit board 4 is exposed from the opening. The optical transceiver 1A performs optical signal communications with other optical transceivers in a two-core bidirectional system using the transmitting optical fiber and the receiving optical fiber. The receiving port 5a and the transmitting port 5b may be collectively referred to as receptacles. The optical transceiver 1A is manufactured, for example, so that it can be inserted into or removed from a cage (not shown) of a host system. When the optical transceiver 1A is inserted into the cage of the host system, the connecting terminal 4c is electrically connected to a connection terminal (not shown) on the host system side, and is supplied with power from the host system, so that the optical transceiver can communicate with the host system by electrical signals.

The optical receiver module 2 is, for example, a ROSA (Receiver Optical Sub-Assembly) incorporating a photodetector such as a photodiode. The optical receiver module 2 converts an optical signal inputted through the receiving optical fiber to an electric received signal. The optical transmitter module 3 is, for example, a TOSA (Transceiver Optical Sub-Assembly) incorporating a light-emitting device such as a laser-diode. The optical transmitter module 3 converts an electric transmission signal into an optical signal, and outputs the optical signal to the transmitting optical fiber. The optical transmitter module 3 may incorporate an optical modulator. In such a case, the optical transmitter module 3 uses the optical modulator to convert the electrical transmission signal into the optical signal. ROSA and TOSA are sometimes collectively referred to as Optical Sub-Assembly. Inside the housing 5, the optical receiver module 2 and the optical transmitter module 3 are provided close to each other in a direction A2 intersecting with (orthogonal to, in one example) the direction A1. The direction A2 coincides with, for example, a direction in which the transmitting optical fiber and the receiving optical fiber are arranged. The direction A2 is a transverse direction crossing the direction A1 which is a longitudinal direction, for example. Miniaturization of the optical transceiver 1A is performed, for example, by reducing the outer dimension in the direction A1 of the housing 5 and the outer dimension in the direction A2 of the housing 5, respectively. The miniaturization of the optical transceiver 1A results in increase of the number of optical transceivers that can be mounted per transmission equipment. Thus, it is possible to increase the transmission capacity of the transmission equipment.

The circuit board 4 includes, for example, a driver circuit 4a and a signal processing circuit 4b. The driver circuit 4a drives the optical transmitter module 3. The signal processing circuit 4b provides a processed signal to the driver circuit 4a and also processes the electric received signal outputted from the optical receiver module 2. The circuit board 4 is electrically connected to the optical transmitter module 3 through a flexible wiring board 6. The circuit board 4 is electrically connected to the optical receiver module 2 through a flexible wiring board 7. The electric transmission signal (drive signal) outputted from the driver circuit 4a is transmitted to the optical transmitter module 3 through a wiring formed on the circuit board 4 and the flexible wiring board 6. The electric received signal outputted from the optical receiver module 2 is transmitted to the signal processing circuit 4b through the flexible wiring board 7 and a wiring formed on the circuit board 4. The flexible wiring board has, for example, a connection terminal at one end, and the connection terminal is connected to the circuit board 4 by solder.

Figure 2:
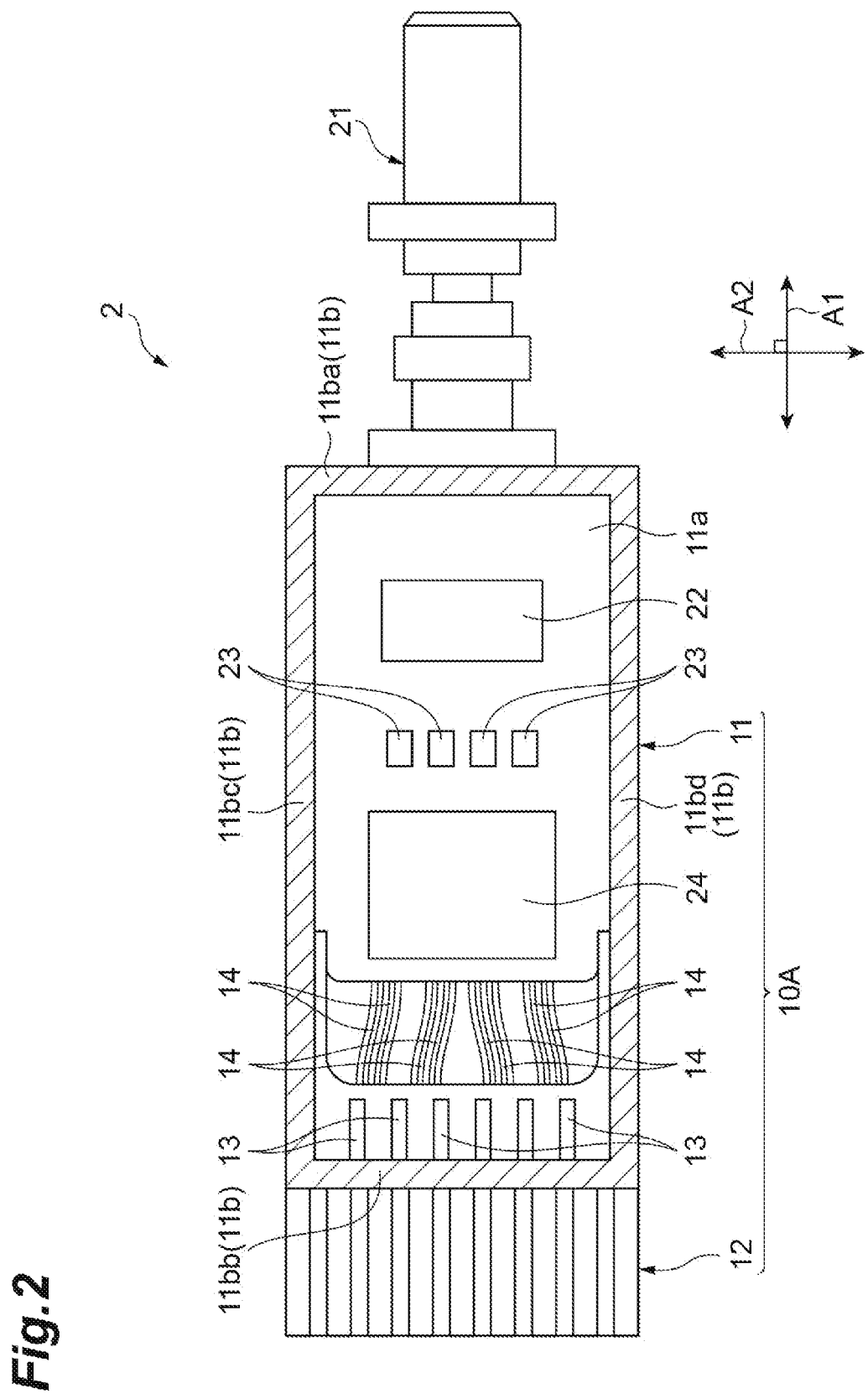
FIG. 2 is a plan view schematically showing a configuration of an optical receiver module.

FIG. 2 is a plan view schematically showing a configuration of the optical receiver module 2. As shown in FIG. 2, the optical receiver module 2 includes a package 10A for optical receiver module, an optical receptacle portion 21, a spectroscope (optical demultiplexer) 22, N photodetectors 23, and a transimpedance amplifier (TIA) 24. N is an integer of 1 or more, and FIG. 2 illustrates the case where N is 4. Hereinafter, the package for the optical receiver module is simply referred to as the package. The package 10A is a hollow container having a rectangular parallelepiped shape extending along the direction A1. The package 10A has a housing 11 and a feedthrough 12. The housing 11 is made of a conductor such as, for example, a metal. The housing 11 has a rectangular bottom plate 11a, and a sidewall 11b. When viewed in plan from an out-of-plane direction of a plate surface of the bottom plate 11a, a shape of the sidewall 11b is a rectangular frame shape surrounding the plate surface of the bottom plate 11a. The sidewall 11b includes an end wall 11ba (first sidewall), an end wall 11bb (second sidewall), a sidewall 11bc, and a sidewall 11bd. The end walls 11ba and 11bb are spaced apart from each other in the direction A1. That is, the end walls 11ba and 11bb are separated from each other in the direction A1. For example, each wall surface of the end walls 11ba and 11bb is orthogonal to the direction A1. The sidewalls 11bc and 11bd oppose each other in the direction A2. For example, each wall surface of the sidewalls 11bc and 11bd is orthogonal to the direction A2. An opening of the sidewall 11b located on an opposite side of the bottom plate 11a is closed by a lid plate 11c (see FIG. 3). An interior space defined by the base plate 11a, the sidewall 11b, and the lid plate 11c is hermetically sealed, for example. The interior space is defined by the end walls 11ba and 11bb in between in the optical axis direction. The feedthrough 12 is provided to penetrate through the end wall 11bb (second sidewall) to electrically connect the interior space of the housing 11 to the outside. A portion of the feedthrough 12 is located outside the housing 11. One end of the flexible wiring board 7 shown in FIG. 1 is conductively bonded to the portion of the feedthrough 12. The feedthrough 12 has a portion facing the interior space of the housing 11, and has a portion exposed to the outside of the housing 11. For example, the portion exposed to the interior space is connected to the TIA 24 by a wire, and the electric received signal outputted from the TIA 24 is transmitted through the wire and the feedthrough 12 to the outside of the housing 11. A portion where the feedthrough 12 penetrates the end wall 11bb (second sidewall) is in close contact with the end wall 11bb, and the interior space can be hermetically sealed.

The optical receptacle portion 21 is an optical port for introducing wavelength-multiplexed optical signal along the direction A1 which is the optical axis direction. The optical receptacle portion 21 has a cylindrical shape centered on the optical axis along the direction A1. The optical receptacle portion 21 is fixed at one end thereof to the end wall 11ba (first sidewall) of the package 10A. The optical receptacle portion 21 has a built-in cylindrical sleeve. The sleeve mates with a cylindrical ferrule of an optical connector attached to a distal end of the receiving optical fiber. The optical receptacle portion 21 further includes a lens. The lens collimates the optical signal outputted from the receiving optical fiber. The collimated optical signal, i.e. the collimated beam, is introduced into the interior space of the package 10A along the optical axis through an opening formed in the end wall 11ba. In other words, the end wall 11ba (first sidewall) has a cylindrical opening, and the optical receptacle portion 21 is fixed to the end wall 11ba so that the cylindrical opening is closed without gaps. The optical signal inputted from the receiving optical fiber is introduced into the interior space through the ferrule and the lens, and is spatially transmitted in the interior space to enter the spectroscope 22.

The spectroscope 22 is an optical component (optical demultiplexer) for demultiplexing the wavelength-multiplexed optical signal into a plurality of wavelength components (optical signal of a single wavelength). The spectroscope 22 is accommodated in the housing 11 and optically coupled to the optical receptacle portion 21. The spectroscope 22 receives the optical signal outputted from the optical receptacle portion 21. The spectroscope 22 demultiplexes the optical signal into a plurality of wavelength components. The spectroscope 22 provides these wavelength components to the photodetectors 23 each of which corresponds to each wavelength component. The plurality of wavelength components are collimated beams, and are treated as optical signals having different peak wavelengths. The optical signals having the different peak wavelengths are single optical signals independent of each other, and each carries different information. Therefore, the wavelength-multiplexed optical signal carries a large amount of information corresponding to the number of multiplexed single optical signals. For example, in FIG. 2, the spectroscope 22 separates the wavelength-multiplexed optical signal into four single optical signals. The wavelength-multiplexed optical signal transmits four times the amount of information transmitted by the single optical signal.

N pieces of photodetector 23 are accommodated inside the housing 11 and optically coupled to the spectroscope 22. For example, the N pieces of the photodetector 23 are mounted on the base plate 11a, and arranged side by side along the direction A2. Each of the photodetectors 23 receives the corresponding wavelength component (the single optical signal) from the spectroscope 22, and generates an electrical signal corresponding to the light intensity of the wavelength component. Thus, each of the photodetectors 23 converts the optical signal received from the spectroscope 22 to a current signal which is an electrical signal having high frequency. By optically coupled, it is meant, for example, that the spectroscope 22 and the photodetector 23 are arranged so that the optical signal outputted from the spectroscope 22 enters the photodetector 23 so that the optical signal is appropriately converted to the electrical signal. Between the spectroscope 22 and the photodetector 23, optical components such as optical lenses, optical filters, and mirrors may be disposed. For example, when the spectroscope 22, the photodetector 23, the mirror, and the lens are arranged so that the optical signal outputted from the spectroscope 22 is reflected by the mirror, condensed by the lens (condenser lens), and incident on a light receiving surface of the photodetector 23, then the spectroscope 22 and the photodetector 23 are optically coupled with each other. The lens may be mounted on every photodetector 23. The photodetectors 23 are electrically connected to the TIA 24. Each of the photodetectors 23 provides generated current signal (photocurrent) to the TIA 24. The TIA 24 converts the current signal received from the respective photodetectors 23 to the electric received signal, which is a voltage signal. The electric received signal generated in the TIA 24 is outputted to the outside of the optical receiver module 2 via the feedthrough 12 as described above. These electric received signals are sent to, for example, the signal processing circuit 4b on the circuit board 4 via the flexible wiring board 7 shown in FIG. 1. Incidentally, when the optical signal inputted from the receiving optical fiber is a single optical signal having one peak wavelength, the spectroscope 22 becomes unnecessary. When the spectroscope 22 is not provided in the optical receiver module 2, the lens and the photodetector 23 may be disposed so that optical signal outputted from the optical receptacle portion 21 is incident directly on an incident surface of the photodetector 23.

Figure 3:
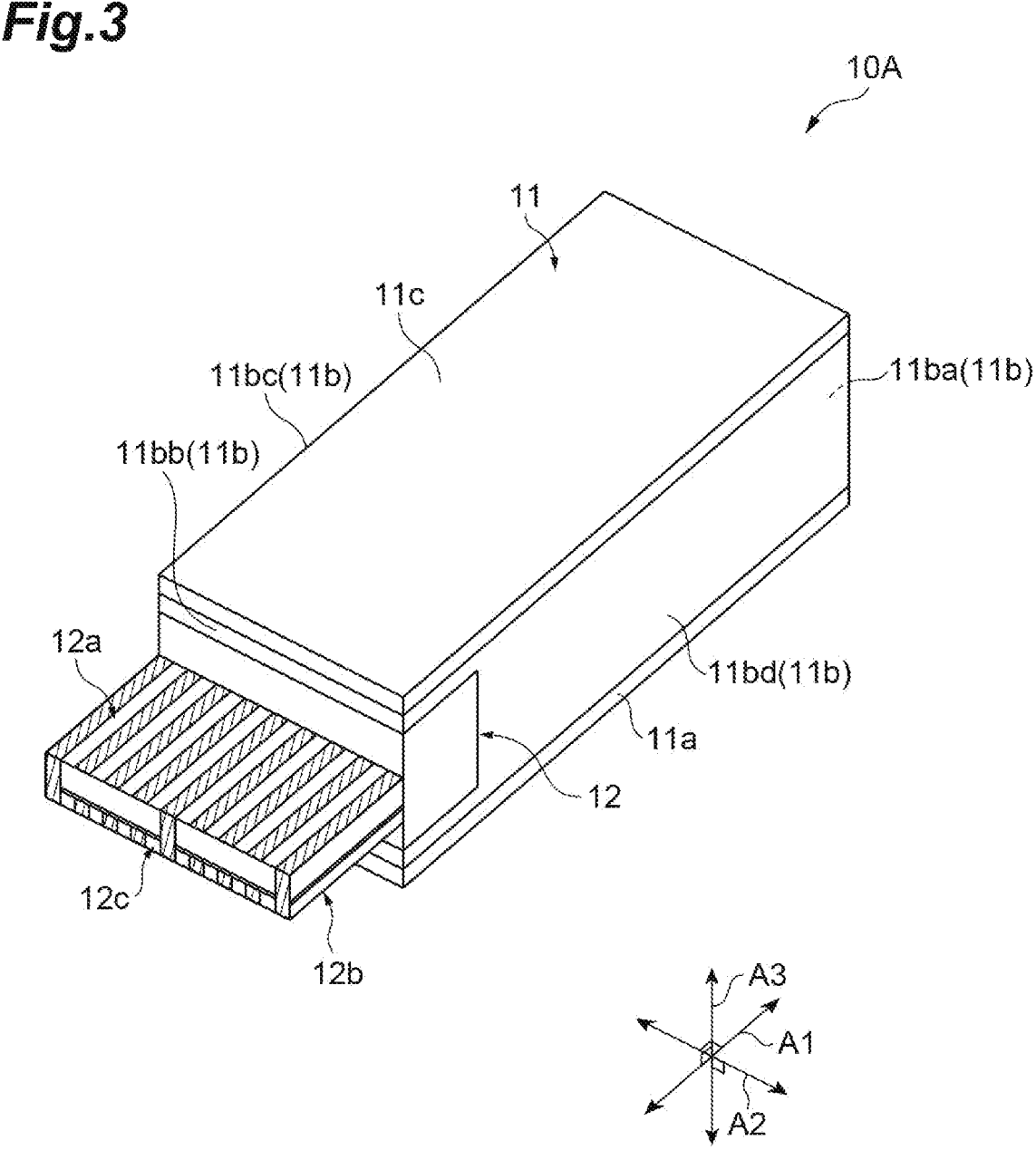
FIG. 3 is a perspective view showing an external appearance of a package.

FIG. 3 is a perspective view showing an external appearance of the package 10A. As described above, the package 10A of the present embodiment includes the housing 11 and the feedthrough 12. The housing 11 is a conductive container, and includes the base plate 11a, the sidewall 11b, and the lid plate 11c. The sidewall 11b includes the end wall 11ba, the end wall 11bb, the sidewall 11bc, and the sidewall 11bd. The end walls 11ba and 11bb face each other in the direction A1. For example, the wall surface of the end wall 11bb has a portion parallel to the wall surface of the end wall 11ba. The end walls 11ba and 11bb extend along a plane intersecting the direction A1 (i.e., extend along the direction A2). The end wall 11ba is located at one end of the housing 11 in the direction A1. The end wall 11bb is located at the other end of the housing 11 in the direction A1. The end wall 11bb is closer to the feedthrough 12 than the end wall 11ba, and the end wall 11ba is closer to the optical receptacle portion 21 than the end wall 11bb. The sidewalls 11bc and 11bd face each other in the direction A2. The sidewalls 11bc and 11bd extend along a plane intersecting the direction A2 (i.e., extend along the direction A1). For example, the wall surface of the sidewall 11bd has a portion parallel to the wall surface of the sidewall 11bc.

The feedthrough 12 is configured to include a dielectric material such as, for example, plastics or ceramics. The feedthrough 12 penetrates through the end wall 11bb along the direction A1. The feedthrough 12 includes a portion located inside the housing 11 and a portion located outside the housing 11. As shown in FIG. 2, a plurality of direct current (DC) wirings 13 (first wirings) and N pieces of electrical signal wiring 14 (second wiring) are provided on a surface of the portion of feedthrough 12 located inside the housing 11. The DC wirings 13 and the electrical signal wirings 14 face the interior space of the housing 11. The plurality of the DC wirings 13 includes at least one of a monitor wiring and a power wiring. The monitor wiring is a wiring for transmitting signals from, for example, a thermal sensor or a light-intensity monitor provided in the interior space. The power wiring is a wiring for supplying power to the photodetectors 23, the TIA 24 or both from an external power supply. The power wiring may include a grounding wiring having a reference potential. The N pieces of the electrical signal wiring 14 are coplanar transmission lines or microstrip transmission lines for transmitting the received signals, e.g., the electrical signals having high frequency. One end of each electrical signal wiring 14 is electrically connected to the TIA 24 via a wire (bonding wire). For example, the TIA 24 has pads for wire bonding, and each pad is connected to one end of the corresponding DC wiring 13 near the TIA 24 by the wire. Although each electrical signal wiring 14 including a pair of differential signal wirings is shown as an example, each electrical signal wiring 14 may include a single signal wiring. The grounding wiring is provided around each electrical signal wiring 14. The electrical signals are generated based on the photocurrents converted from the optical signals by the photodetectors 23. For example, the TIA 24 amplifies the photocurrents and converts the amplified photocurrents into voltage-signals. The voltage-signals outputted from the TIA 24 are further amplified by a limit amplifier (LIA). The amplified voltage signals, after being wave-shaped by a clock data recovery (CDR) circuit, their logic values are identified to become digital signals.

The portion of the feedthrough 12 located outside of the housing 11 projects from the end wall 11bb along the direction A1. The portion of the feedthrough 12 has a first layer 12a and a second layer 12b. The first layer 12a and the second layer 12b extend from the end wall 11bb away from the end wall 11ba. The first layer 12a and the second layer 12b oppose each other in a direction A3 that intersects both directions A1 and A2. The direction A1 is a longitudinal direction of the housing 11, and when the direction A2 is a lateral direction, the direction A3 is a height direction. Both the first layer 12a and the second layer 12b are flat and parallel to each other. The first layer 12a and the second layer 12b extend along the directions A1 and A2. The first layer 12a and the second layer 12b are parallel to the optical axis direction (direction A1). The feedthrough 12 has an end face 12c on one end in the direction of the optical axis. The end face 12c connects the first layer 12a and the second layer 12b, and extends along the end wall 11bb, that is, along the direction A2. The end face 12c extends along a plane intersecting a projection direction of the feedthrough 12 outwardly from the housing 11, that is, along the direction A1. For example, in the Cartesian coordinate where X-axis, Y-axis, and Z-axis are orthogonal to each other, when the X-axis is taken as the direction A1, the end face 12c is in a plane parallel to the YZ plane. For example, the direction A2 corresponds to the Y-axis direction, and the direction A3 corresponds to the Z-axis direction. For example, when the shape of the end face 12c is rectangular viewed from the direction A1, a longitudinal direction of the shape corresponds to the direction A2. The direction A2 is, for example, a lateral direction. The direction A3 intersects with the direction A1 and the direction A2, and is, for example, a height direction. For example, the first layer 12a and the second layer 12b are parallel to the direction A1 and parallel to the direction A2.

Figure 4:
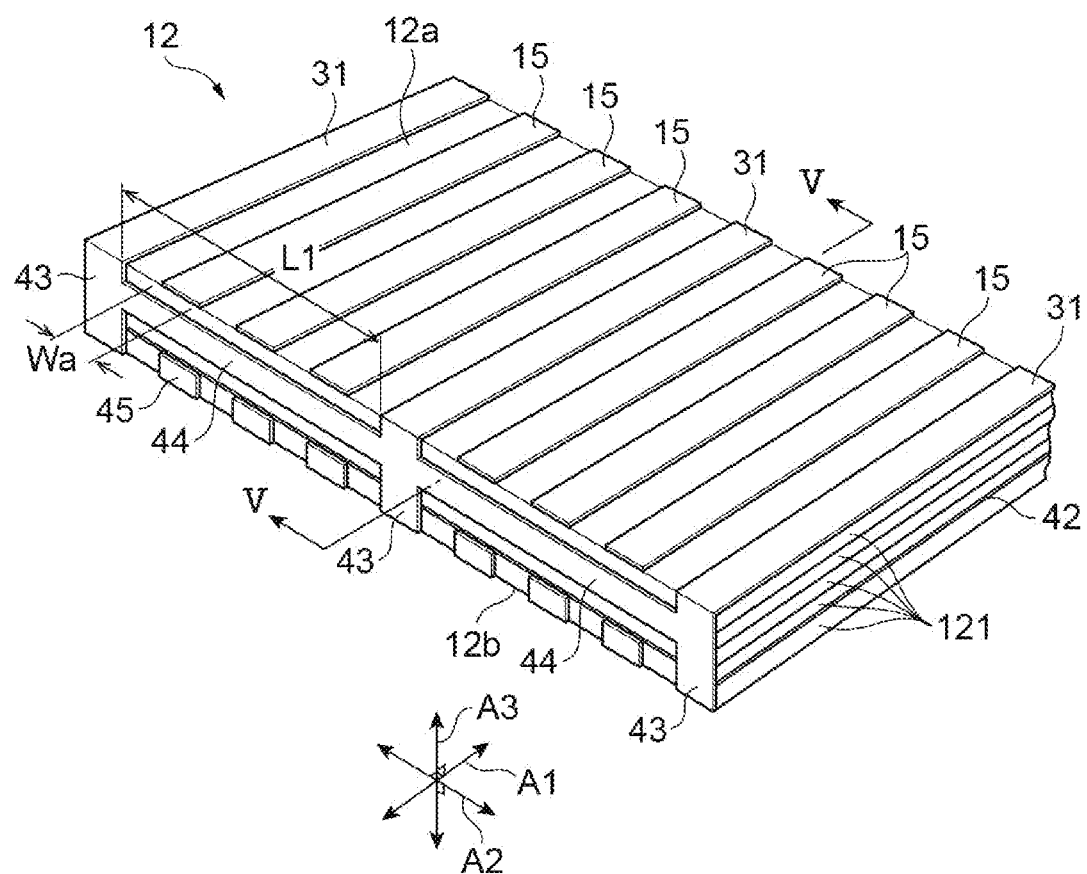
FIG. 4 is an enlarged perspective view of a portion of FIG. 3.

FIG. 4 is an enlarged perspective view of a portion of FIG. 3. FIG. 4 shows only the part of the feedthrough 12 protruding from the end wall 11bb in an enlarged manner. As shown in FIG. 4, the first layer 12a is provided with M pieces of DC pads 15 and J pieces of ground pads 31. M is an integer of 2 or more, M is 6 in the illustrated example. J is an integer of 1 or more, J is 3 in the illustrated example. The DC pads 15 are examples of a plurality of third wirings in the present embodiment. The ground pad 31 is an example of the grounding wiring in the present embodiment. The M pieces of DC pads 15 and the J pieces of ground pads 31 are metallic films fixed on the feedthrough 12 of the dielectric materials. Each of the DC pads 15 is electrically connected to the corresponding DC wiring 13 through a wiring embedded in the feedthrough 12. Each of the DC pads 15 has an elongated shape extending along the direction A1. The M pieces of DC pads 15 are aligned along the end wall 11bb (i.e., along the direction A2 crossing the direction A1). Each of the ground pads 31 is connected to a reference potential of the circuit board 4 via a ground terminal of the flexible wiring board 7 (see FIG. 1). Each of the ground pads 31 is disposed between the DC pads 15 or at both ends of the DC pads 15 arranged along the direction A2. For example, as shown in FIG. 4, one ground pad 31 is disposed between the third and fourth counted from the end of the six DC pads 15. Therefore, three ground pads 31 are arranged so as to sandwich three DC pads 15 between the ground pads 31. In one example, the length of each DC pad 15 and each ground pad 31 in the direction A1 is in the range of 0.8 mm to 1.4 mm. A center pitch of the DC pads 15 in the direction A2 is in the range of 0.3 mm to 0.6 mm A width Wa of each DC pad 15 in the direction A2 is in the range of 0.1 mm to 0.4 mm. For example, when the DC pads 15 having the width Wa of 0.4 mm are arranged along the direction A2 at the center pitch of 0.6 mm, the distance between the DC pads 15 is 0.2 mm.

The feedthrough 12 includes a plurality of dielectric layers 121 stacked along the direction A3. The dielectric layers 121 are made of, for example, a ceramic such as alumina or aluminum nitride. The dielectric layers 121 may be formed of, for example, glass fiber, epoxy resin, or the like similarly to a conventional printed circuit board. The feedthrough 12 may be a multilayer substrate in which a plurality of wiring layers and a plurality of dielectric layers 121 are laminated. For example, the feedthrough 12 is a ceramic-multilayered substrate. For example, the first layer 12a is the uppermost wiring layer in a height direction (i.e., the direction A3). For example, the second layer 12b is the lowest wiring layer in the height direction (i.e., the direction A3). The feedthrough 12 has a ground pattern 42. The ground pattern 42 is embedded between the layers of the two dielectric layers 121 located between the first layer 12a and the second layer 12b. The ground pattern 42 is a conductive layer such as a metal layer extending along the first layer 12a and the second layer 12b. Between the ground pattern 42 and the first layer 12a, at least one layer of the dielectric layers 121 is interposed. Between the ground pattern 42 and the second layer 12b, at least one layer of the dielectric layers 121 is interposed. In the example according to FIG. 4, only one layer of the ground pattern 42 is provided, but a plurality of layers of the ground pattern 42 may be provided. Further, when no ground pattern 42 is disposed between two dielectric layers 121 adjacent along the direction A3, a conductive pattern may be disposed between the two dielectric layers 121.

The feedthrough 12 further includes J pieces of electromagnetic wave shielding film 43 (second shielding film). These electromagnetic wave shielding films 43 are metallic films fixed on the end face 12c. Each of the electromagnetic wave shielding films 43 is provided in one-to-one correspondence with the ground pad 31, and is in contact with the ground pad 31. For example, each electromagnetic wave shielding film 43 is in contact with the corresponding ground pad 31 at a side where the first layer 12a and the end face 12c intersect, and is electrically connected to the corresponding ground pad 31. Each of the electromagnetic wave shielding films 43 extends from the first layer 12a to the second layer 12b on the end face 12c, and is in contact with the ground pattern 42 on the way. That is, the ground pads 31 are electrically connected to the ground pattern 42 via the electromagnetic wave shielding films 43. As a result, the ground pattern 42 and the electromagnetic wave shielding films 43 are defined as the reference potential.

The feedthrough 12 further includes (J-1) pieces of electromagnetic wave shielding film 44 (first shielding film). These electromagnetic wave shielding films 44 are metallic films fixed and formed on the end face 12c of the feedthrough 12. Each electromagnetic wave shielding film 44 extends along the direction of alignment of the DC pads 15 (i.e., the direction A2). The electromagnetic wave shielding films 44 are separated from both the first layer 12a and the ground pattern 42 in an area between the ground pattern 42 and the first layer 12a on the end face 12c. That is, when viewed in plan from the normal direction of the end face 12c (i.e., the direction A1), a gap is provided between each electromagnetic wave shielding film 44 and the first layer 12a. Further, a gap is also provided between each electromagnetic wave shielding film 44 and the ground pattern 42. From these gaps, the dielectric layer 121 is exposed. A length L1 of the gap in the direction A2 is, for example, 6.2 mm. One end of each electromagnetic wave shielding film 44 is connected to one of the electromagnetic wave shielding films 43. The other end of each electromagnetic wave shielding film 44 is connected to another electromagnetic wave shielding film 43. Therefore, the electromagnetic wave shielding films 44 are electrically connected to the ground pads 31 and the ground pattern 42 via the electromagnetic wave shielding films 43, and are defined as the reference potential. Heights of the electromagnetic wave shielding films 44 in the direction A3 perpendicular to the direction A2, that is, widths of the electromagnetic wave shielding films 44 in the direction A3, are determined according to the thicknesses of the dielectric layers 121, for example. The widths of the electromagnetic wave shielding films 44 are 0.466 mm in one instance.

Figure 5:
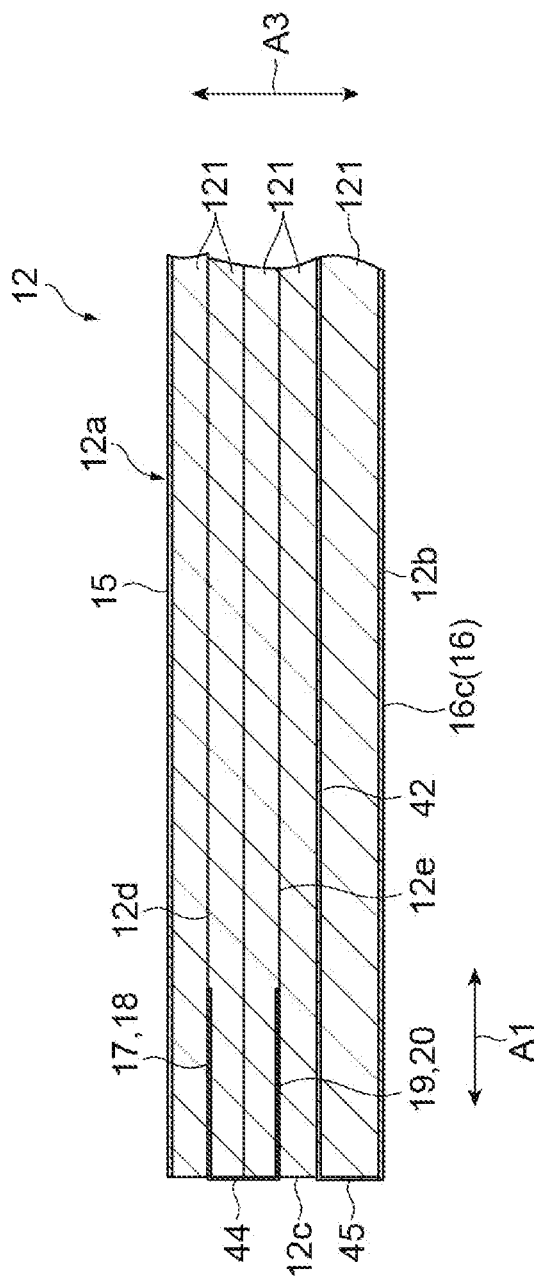
FIG. 5 is a cross-sectional view taken along line V-V of FIG. 4.

FIG. 5 is a cross-sectional view taken along line V-V of FIG. 4. As shown in FIG. 5, the feedthrough 12 has a third layer 12d and a fourth layer 12e therein. The third layer 12d and the fourth layer 12e are regions between neighboring dielectric layers 121 in the stacked dielectric layers 121. The third layer 12d is sandwiched between two neighboring dielectric layers 121 in the direction A3. The fourth layer 12e is sandwiched between two neighboring dielectric layers 121 in the direction A3. Accordingly, the third layer 12d and the fourth layer 12e do not face the outside like the first layer 12a and the second layer 12b, but can form conductive patterns such as a conductive cell 17, a wiring portion 18, which will be described later, respectively. For example, the third layer 12d and the fourth layer 12e each correspond to a wiring layer in a multi-layer board. The third layer 12d and the fourth layer 12e extend along planes that are parallel to the first layer 12a and the second layer 12b. In the direction A3, the third layer 12d is located between the first layer 12a and the ground pattern 42. In the direction A3, the fourth layer 12e is located between the third layer 12d and the ground pattern 42. In the illustrated embodiment, one layer of the dielectric layers 121 is interposed between the first layer 12a and the third layer 12d. Two layers of the dielectric layers 121 are interposed between the third layer 12d and the fourth layer 12e. Between the fourth layer 12e and the ground pattern 42, one layer of the dielectric layers 121 is interposed. The above-described electromagnetic wave shielding films 44 are provided in an area from the third layer 12d to the fourth layer 12e in the end face 12c. Two layers of the dielectric layers 121 adjacent the third layer 12d in the direction A3 may be in face contact with each other. Two layers of the dielectric layers 121 adjacent the fourth layer 12e in the direction A3 may be in face contact with each other.

Figure 6:
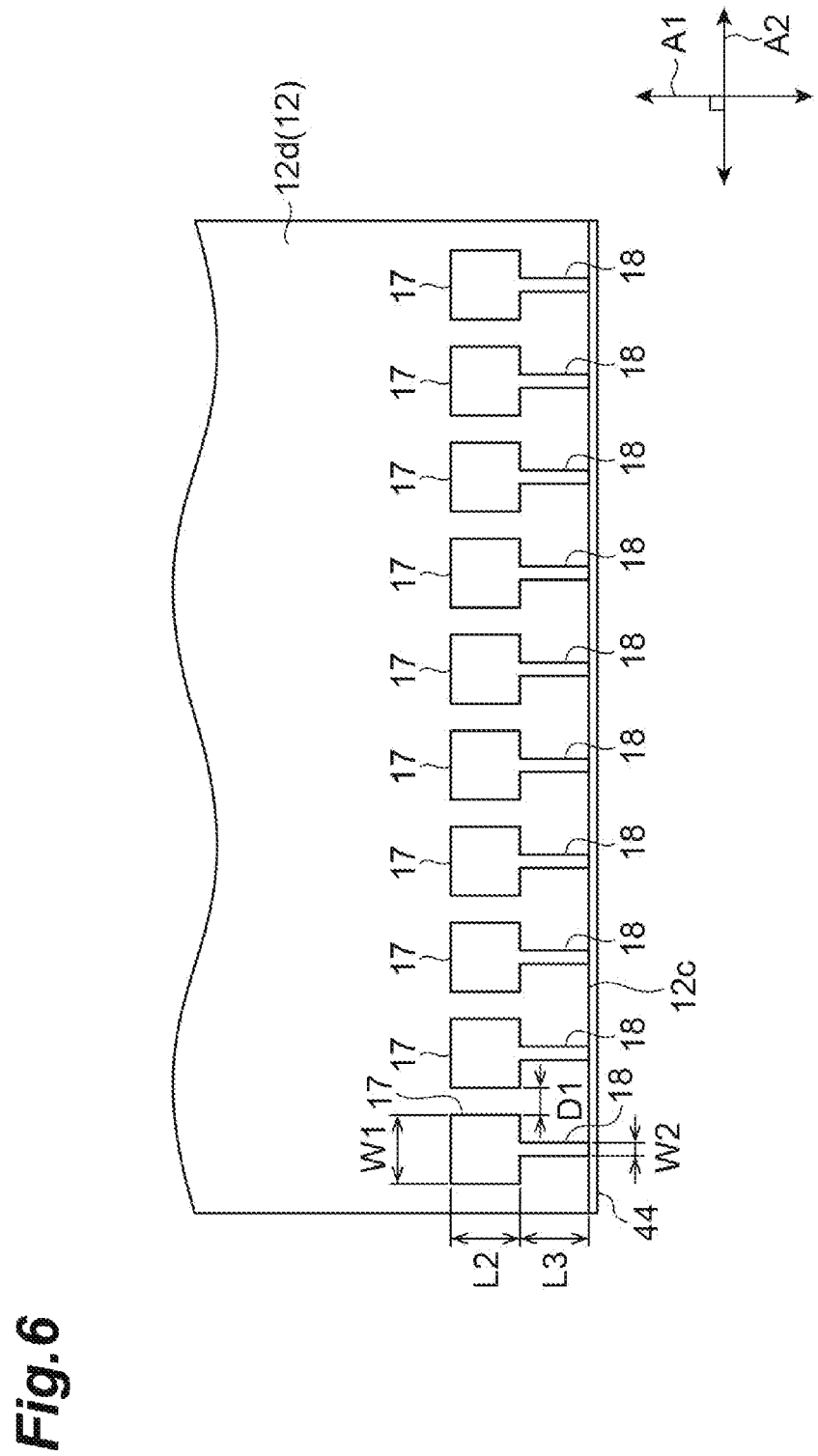
FIG. 6 is a plan view of a third layer as viewed from a thickness direction of the feedthrough.

FIG. 6 is a plan view of the third layer 12d as viewed from the thickness direction of the feedthrough 12. The thickness direction of the feedthrough 12 is a stacking direction along which the dielectric layers 121 are stacked, and corresponds to the direction A3. As shown in FIG. 6, the feedthrough 12 has a plurality of conductive cells 17 (first conductive cells). The plurality of the conductive cells 17 are embedded between layers of the dielectric layer 121 in the third layer 12d. As described above, in regions other than the conductive cells 17 of the third layer 12d, the two dielectric layers 121 sandwiching the third layer 12d may be in contact with each other. The conductive cells 17 are provided in an area away from the end face 12c in the direction A1. The conductive cells 17 are periodically aligned along the first layer 12a and the end wall 11bb (i.e., in the direction A2) at regular intervals from one another. The planar shape of each conductive cell 17 may be the same shape as each other, and may be various shapes such as, for example, a rectangle, a square, a polygon, and a circle. When the planar shape as viewed from the direction A3 of each conductive cell 17 is a rectangular shape or a square shape, for example, a pair of mutually opposed sides of each conductive cell 17 is along the direction A1, and another pair of mutually opposed sides is along the direction A2. The size of the respective conductive cells 17 is sufficiently smaller than the wavelength of electromagnetic wave noise which is typically the wavelength corresponding to the fundamental frequency of the electrical signal of the optical transmitter module 3. This electromagnetic wave noise may be considered as a detrimental electromagnetic wave which is desired to be prevented from passing through the feedthrough 12 and entering into the interior space of the housing 11. For example, if the wavelength of the electromagnetic wave noise is 25 GHz, in other words, in order to prevent the electromagnetic wave above frequency 25 GHz penetrating into the interior of the housing 11, the width W1 of the direction A2 of each conductive cell 17, and the length L2 of the direction A1 of each conductive cell 17 are both 0.5 mm or less. In one embodiment, the width W1 and the length L2 of the respective conductive cells 17 are both 0.2745 mm. When the planar shape of the respective conductive cells 17 is rectangular, the width W1 may be longer than the length L2, and the length L2 may be longer than the width W1. If the dielectric layers 121 are made of ceramic, the lower limit of the width W1 and length L2 due to manufacturing are both about 30 μm.

The capacitance between adjacent conductive cells 17 is determined by a distance D1 between the conductive cells 17 and the length L2 of each conductive cell 17 in the direction A1. The capacitance between the conductive cells 17 is set to a value possible of attenuating the electromagnetic wave noise having the expected frequencies. When the electromagnetic wave noise has a wavelength corresponding to a frequency 25 GHz and the length of each conductive cell 17 in the direction A1 is 0.2745 mm, the distance D1 is set to, for example, 0.13 mm. When each conductive cell 17 has a square planar shape, the arrangement period of the conductive cells 17 is 0.4045 mm. In this case, for example, it is possible to arrange a plurality of conductive cells 17 substantially evenly with respect to the length L1 of the gap (6.2 mm) The numerical examples of the dimensions shown here do not agree with the shapes shown in FIG. 6. FIG. 6 illustrates how a plurality of conductive cells 17 are arranged, regardless of examples of particular dimensions.

The plurality of conductive cells 17 are electrically connected to the respective ground pads 31. Therefore, the feedthrough 12 of the present embodiment has a plurality of wiring portions 18. Each wiring portion 18 is provided in a one-to-one correspondence with each conductive cell 17 in the third layer 12d. Thus, in the third layer 12d, the number of the wiring portions 18 is equal to the number of the conductive cells 17. The wiring portions 18 extend from the corresponding conductive cells 17 toward the electromagnetic wave shielding films 44 in the projection direction of the feedthrough 12 (i.e., the direction A1). A planar shape of each wiring portion 18 is an elongated shape in which the projection direction of the feedthrough 12 as a longitudinal direction. Each of the wiring portions 18 electrically connects the corresponding conductive cell 17 and the corresponding electromagnetic wave shielding film 44. As described above, the electromagnetic wave shielding films 44 are electrically connected to the ground pads 31. Accordingly, each conductive cell 17 is electrically connected to the ground pads 31 via each wiring portion 18 and the electromagnetic wave shielding films 44, and is defined as the reference potential.

The size of the respective wiring portions 18 is smaller than the wavelength of the electromagnetic wave noise, which is typically the wavelength corresponding to the fundamental frequency of the electrical signal of the optical transmitter module 3. An inductance of the respective wiring portions 18 is determined by a length L3 of the respective wiring portions 18 in the direction A1 and a width W2 of the respective wiring portions 18 in the direction A2. In other words, the length L3 is a distance between the respective conductive cells 17 and the end face 12c. The width W2 is smaller than the width W1 of each conductive cell 17. For example, the width W2 is ½ or less of the width W1. The inductance of each wiring portion 18, together with the capacitance between the conductive cells 17 described above, is set to a value enabling attenuation of the electromagnetic wave noise of the frequency to a desired degree. For example, when the wavelength of the electromagnetic wave noise is a wavelength corresponding to a frequency 25 GHz, the length L3 is set to 0.5 mm or less (e.g., 0.35 mm in one embodiment), and the width W2 is set to 0.033 mm, for example.

Figure 7:
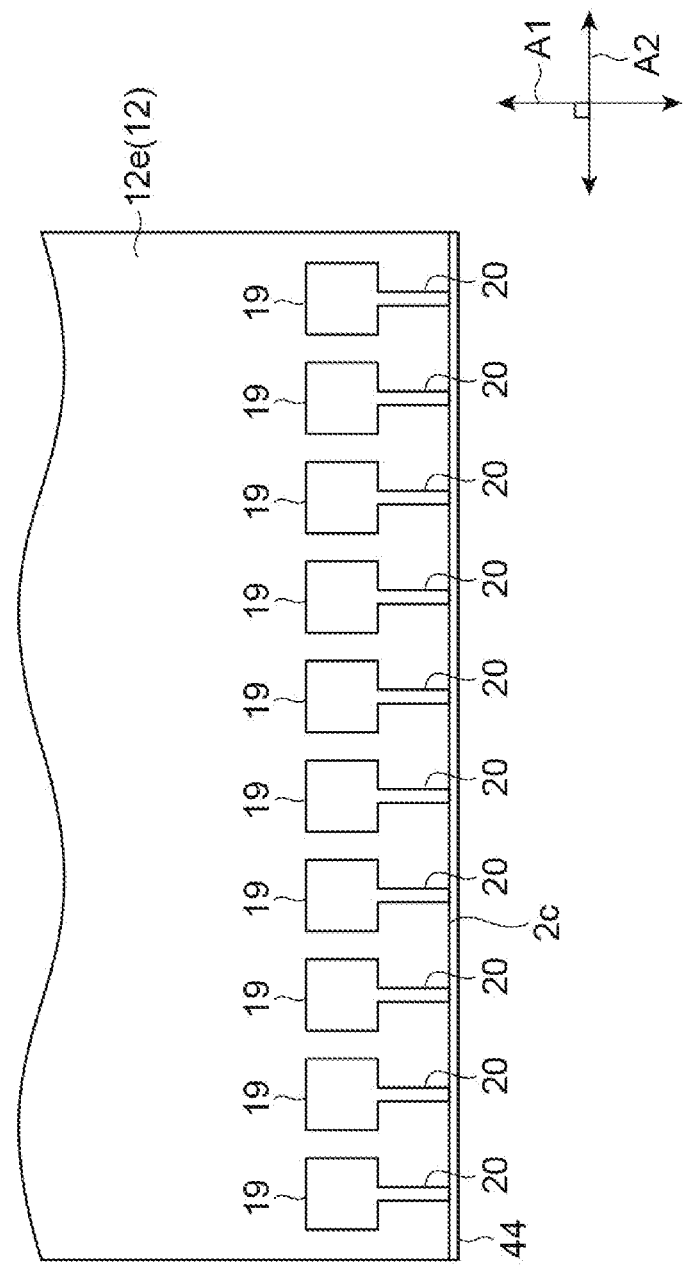
FIG. 7 is a plan view of a fourth layer as viewed from a thickness direction of the feedthrough.

FIG. 7 is a plan view of the fourth layer 12e as viewed from the thickness direction of the feedthrough 12. As shown in FIG. 7, the feedthrough 12 has a plurality of conductive cells 19 (second conductive cells). The plurality of the conductive cells 19 are embedded between layers of the dielectric layer 121 in the fourth layer 12e. As described above, in regions other than the conductive cell 19 are provided in the fourth layer 12e, the two dielectric layers 121 sandwiching the fourth layer 12e may be contacted with each other. The conductive cells 19 are provided in an area away from the end face 12c in the direction A1. The conductive cells 19 are periodically aligned along the first layer 12a and the end wall 11bb (i.e., in the directions A2) at regular intervals from one another. As in the conductive cells 17 described above, the planar shapes, sizes, and arrangements of the respective conductive cells 19 are set to a value possible of attenuating the electromagnetic wave noise of expected frequencies. However, the planar shape and the size of each conductive cell 19 may be the same as or different from the planar shape and the size of each conductive cell 17, as far as every conductive cell 19 has the same as each other. The size of the respective conductive cells 19 is sufficiently smaller than the wavelength of the electromagnetic wave noise which is typically the wavelength corresponding to the fundamental frequency of the electrical signal of the optical transmitter module 3. This electromagnetic wave noise may be considered as a detrimental electromagnetic wave which is desired to be prevented from passing through the feedthrough 12 and entering into the interior space of the housing 11.

The plurality of the conductive cells 19 are electrically connected to the respective ground pads 31. Therefore, the feedthrough 12 of the present embodiment has a plurality of wiring portions 20. Each of the wiring portions 20 is provided in a one-to-one correspondence with each conductive cell 19 in the fourth layer 12e. Therefore, in the fourth layer 12e, the number of the wiring portions 20 is equal to the number of the conductive cells 19. The wiring portions 20 extend from the corresponding conductive cells 19 toward the electromagnetic wave shielding films 44 in the projection direction of the feedthrough 12 (direction A1). A planar shape of the respective wiring portions 20 is an elongated shape in which the projection direction of the feedthrough 12 as a longitudinal direction. Each of the wiring portions 20 electrically connects the corresponding conductive cells 19 and the corresponding electromagnetic wave shielding film 44. As described above, the electromagnetic wave shielding films 44 are electrically connected to the ground pads 31. Accordingly, each conductive cell 19 is electrically connected to the ground pads 31 and the ground pattern 42 via each wiring portion 20 and each electromagnetic wave shielding film 44, and is defined as the reference potential. A length and a width of the respective wiring portions 20 are set to values possible of attenuating the electromagnetic wave noise of the expected frequencies to a desired degree, similarly to the wiring portions 18 described above. However, the length and width of the wiring portions 20 may be the same as or different from the length and width of the wiring portions 18.

Figure 8:
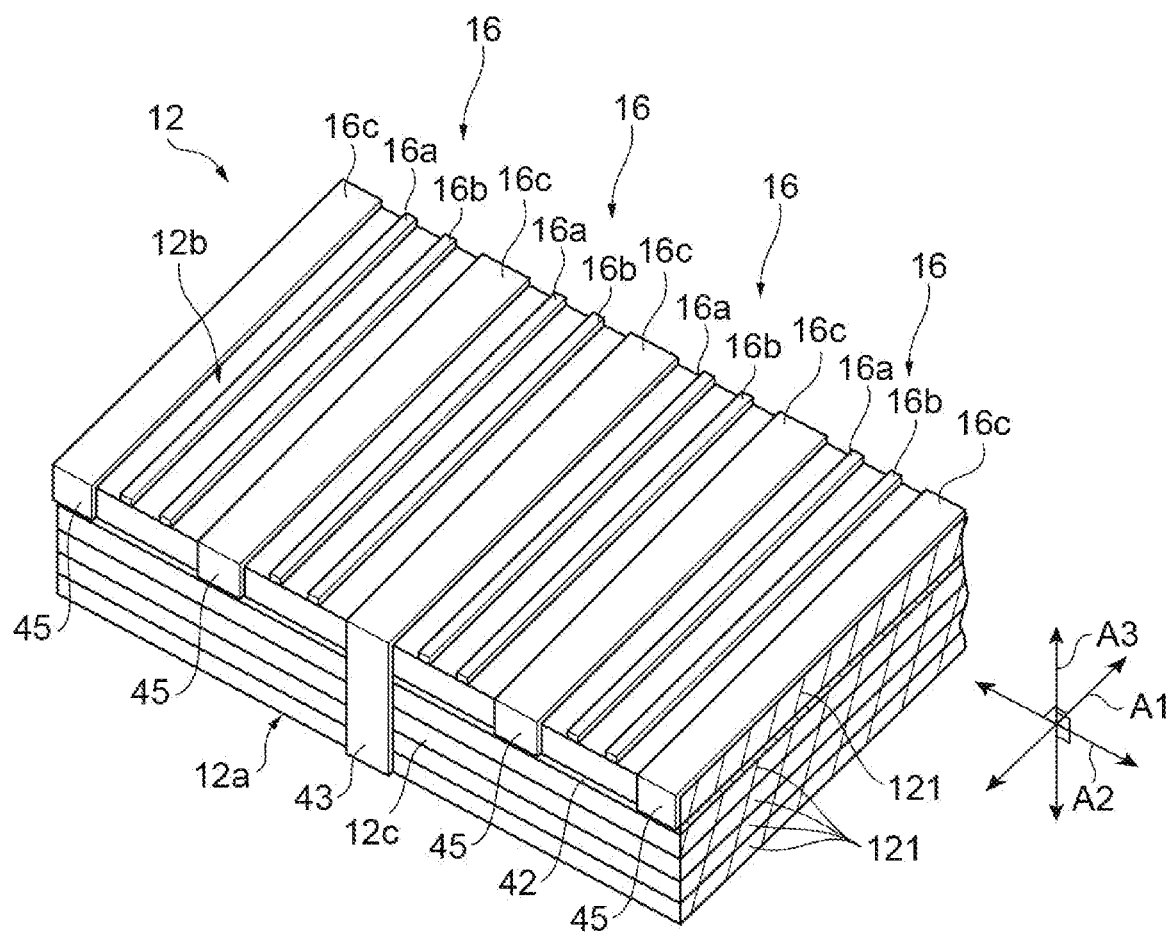
FIG. 8 is an enlarged perspective view of a portion of an external appearance of a package.

FIG. 8 is an enlarged perspective cross-sectional view of a portion of an external appearance of the package 10A. FIG. 8 shows a portion of the feedthrough 12 protruding from the end wall 11bb viewed from the second layer 12b side. As shown in FIG. 8, N electrical signal pads 16 (fourth wirings) are provided on the second layer 12b of the feedthrough 12. N is an integer of 1 or more, and N is 4 in the illustrated example. Each of the electrical signal pads 16 is a transmission line and transmits the electrical signal transmitted by each of the electrical signal wirings 14. Each of the electrical signal pads 16 includes, for example, a pair of signal pads 16a and 16b. The signal pad 16a is aligned with the signal pad 16b in the direction A2. When the electrical signal is a differential signal in a differential transmission system, thus two signal pads 16a, 16b are used. For example, the signal pad 16a is used for a normal phase component (normal phase signal) of the differential signal, and the signal pad 16b is used for a reverse phase component (reverse phase signal) of the differential signal. Ground pads 16c are provided adjacent to the signal pads 16a and 16b, respectively. For example, the ground pads 16c are disposed on both sides of the pair of the signal pads 16a and 16b in the direction A2. The electrical signal pads 16 adjacent to each other share one of the ground pads 16c. The signal pads 16a, 16b are represented by a symbol S, and the ground pads 16c are represented by a symbol G, then a configuration in which the ground pads are disposed on both sides of the pair of the signal pads 16a and 16b may be referred to as a GSSG structure. When the electrical signal is a differential signal, N electrical signal pads 16 include 2×N signal pads 16a, 16b. Alternatively, by the 2×N signal pads 16a and 16b, it is possible to transmit N differential signals. The signal pads 16a, 16b and the ground pads 16c are metallic films and fixed on the dielectric feedthrough 12. The ground pads 16c are defined as the reference potential. The signal pads 16a, 16b and the ground pads 16c constitute a coplanar line. Each of the electrical signal pads 16 is electrically connected to the corresponding electrical signal wiring 14 (refer to FIG. 2) via the wiring embedded in the feedthrough 12. The second layer 12b is conductively bonded to the other flexible substrate which is provided on top of the flexible wiring board 7. The electrical signal pads 16 are connected to the circuit board 4 through the other flexible substrates. Although the signal pads 16a and 16b for the differential transmission system described above as an example in the figure, each electrical signal pad 16 may include a single signal pad when a differential transmission system is not adopted. In the case of the differential transmission system, one of the differential signals having the normal phase component and the reverse phase component (e.g., the normal phase component) is input to the signal pad 16a, and the other of the differential signals (e.g., the reverse phase component) is input to the signal pad 16b. The normal and reverse phase components are a pair of complementary signals. For example, the reverse phase component decreases when the normal phase component increases, and the reverse phase component increases when the normal phase component decreases. When the normal phase component reaches the maximum value (peak value), the reverse phase component reaches the minimum value (bottom value), and when the normal phase component reaches the minimum value (bottom value), the reverse phase component reaches the maximum value (peak value). The amplitude of the normal phase component is the same as the amplitude of the reverse phase component. The average value of the amplitude of the normal phase component coincides with the average value of the amplitude of the reverse phase component. The normal phase component has a phase that differs from the phase of the reverse phase component by 180°.

Between the ground pattern 42 and the second layer 12b, at least one of the dielectric layers 121 is interposed. The ground pads 16c are electrically connected to the ground pattern 42 via the electromagnetic wave shielding films 43 and 45 provided on the end face 12c. In the present embodiment, the ground pattern 42 is provided for adjusting the impedances of the electrical signal pads 16. That is, the ground pattern 42 can constitute microstrip transmission lines together with the electrical signal pads 16. The ground pattern 42 may be omitted as long as the characteristic impedances of the transmission lines formed by the electrical signal pads 16 can be adjusted to a desired value. For example, the electrical signal pads 16 may constitute coplanar transmission lines.

Advantages obtained by the package 10A of the present embodiment described above will be described. In modern optical transceivers, circuits for driving light-emitting devices incorporated in an optical transmitter module may be provided outside the optical transmitter module. In this instance, electromagnetic wave noises are generated from wirings connecting the driver circuits and the optical transmitter module by electrical signals (drive signals) outputted from the driver circuits. In particular, when an EML (Electroabsorption Modulator Integrated Laser Diode) is used as the light-emitting device incorporated in the optical transmitter module, since the driving voltage for the EML is generally high (e.g., amplitude of 2V), also the electromagnetic wave noise increases. In addition, in recent optical communication systems, a transmission rate of, for example, 50 Gbits/s or 100 Gbits/s is being realized, and high-speed operation is proceeding. The higher the transmission speed of optical communication, the higher the frequency of the drive signal. The higher the frequency of the drive signal, the greater the electromagnetic wave noise radiated from the wiring between the driver circuit and the optical transmitter module. Such electromagnetic wave noise radiation becomes apparent when the transmission rate of optical communication systems becomes 10 Gbits/s or more.

On the other hand, due to downsizing of optical transceivers due to the increase in communication traffic in recent years, an optical transmitter module is often disposed close to an optical receiver module. The above electromagnetic wave noise may cause cross-talk on received signals in the optical receiver module located next to the optical transmitter module due to electromagnetic interferences. In a package of the optical receiver module, a dielectric feedthrough is provided through a portion of a conductive housing. In a conventional optical receiver module, electromagnetic wave noise may penetrate through the dielectric feedthrough into the package.

In an area between the ground pattern 42 and the second layer 12b in the end face 12c, a large number of the electromagnetic wave shielding films 45 corresponding to the ground pads 16c are provided. Alternatively, the ground pads 16c may be connected to the ground pattern 42 via via-holes penetrating the dielectric layer 121. Thereby, the reference potential of the ground pads 16c is more stabilized. Regardless of the structure, the area between the ground pattern 42 and the second layer 12b has a high shielding effect of blocking the electromagnetic wave noise. On the other hand, since the number of the electromagnetic wave shielding film and via-holes is small in an area between the ground pattern 42 and the first layer 12a, the electromagnetic waves having frequencies of 10 GHz or more intrude the area.

In order to suppress such intrusion of electromagnetic waves from the outside, in the package 10A of the present embodiment, the plurality of the conductive cells 17 are provided in the third layer 12d between the first layer 12a and the ground pattern 42. The conductive cells 17 are arranged along the first layer 12a and the wall face of the end wall 11bb so that each neighboring conductive cells are equally spaced. In other words, the conductive cells 17 are aligned parallel to the first layer 12a, and aligned parallel to the wall face of the end wall 11bb along the direction A2. The respective conductive cells 17 are electrically connected to the ground pads 31, thereby being regulated to the reference potential. In this instance, the plurality of conductive cells 17 can constitute a left handed metamaterial. Therefore, in areas around the plurality of conductive cells 17, electromagnetic wave having a specific frequency determined by the shape and arrangement of the plurality of conductive cells 17, such as a spacing between the conductive cells 17, are attenuated. The left handed metamaterial structure of this embodiment, in particular, to effectively attenuate the electromagnetic wave entering from the out-of-plane direction of the end face 12c (direction A1). That is, since the electromagnetic wave noise traveling toward the interior space inside the feedthrough 12 is attenuated, the penetration of the electromagnetic wave noise into the optical receiver module through the feedthrough 12 can be reduced.

Figure 9:
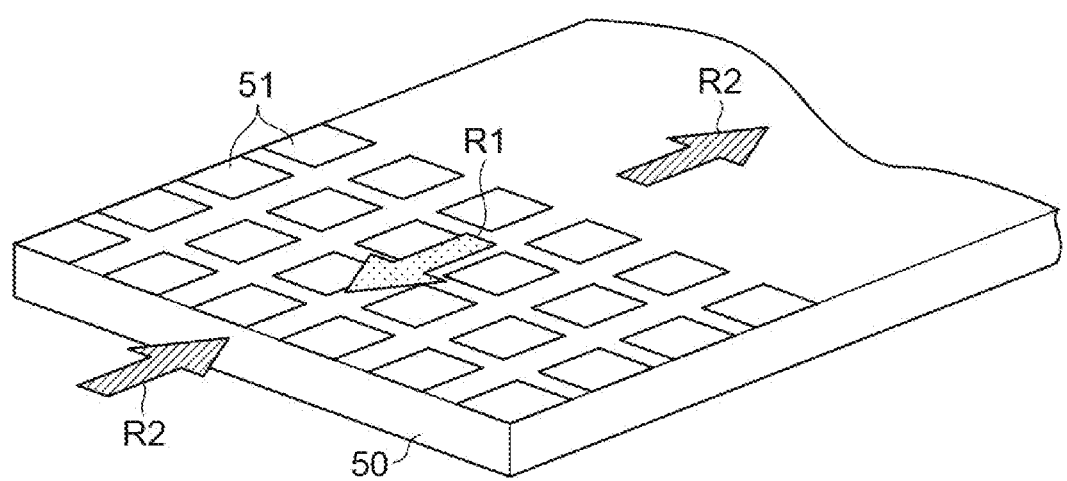
FIG. 9 is a perspective view of a left handed metamaterial consisting of a plurality of mushroom structures (conductive cells). The plurality of mushroom structures are arranged two-dimensionally in a predetermined region on a dielectric substrate.

Here, the left handed metamaterial will be described. FIG. 9 is a perspective view showing an example of the left handed metamaterial. The left handed metamaterial is comprised of a plurality of conductive cells 51 each forming a mushroom construction. The plurality of mushroom structures are two-dimensionally arranged over a plurality of rows and columns on a dielectric substrate 50. Each of the conductive cells 51 is connected to a ground pattern (not shown) on a lower surface through a metallic via (not shown) provided in the dielectric substrate 50. A cross-sectional area of the metallic via is reduced to 1/10 or less of an area of the corresponding conductive cell 51. In this left handed metamaterial, minute unit cells such as metallic pieces (conductive cells 51 in FIG. 9) are periodically arranged at intervals less than or equal to a wavelength of the electromagnetic wave of interest. The shape and arrangement of each unit cell are set according to the wavelength of the electromagnetic wave of interest. This makes it possible to realize an artificial structure having a negative dielectric constant and a negative magnetic permeability, which is not present in natural materials. Such a structure is sometimes referred to as an electromagnetic band gap (EBG) structure.

In FIG. 9, traveling directions of the electromagnetic waves are indicated by arrows. In the region near the above structure, the electromagnetic wave propagates as a backward wave (arrow R1). Therefore, when this structure is placed in a waveguide or the like in which electromagnetic waves propagate as forward waves (arrow R2), the electromagnetic waves cannot be present in a specific frequency region around this structure. Therefore, it is possible to block electromagnetic wave noise that is going to pass around the structure. In addition, no current caused by the electromagnetic wave noise is induced in DC wirings provided around the structure.

The plurality of conductive cells 17 in the present embodiment correspond to the conductive cells 51 of a single row intersecting with the traveling direction of the electromagnetic wave in the conductive cells 51 of the two-dimensional array shown in FIG. 9. The wiring portion 18 corresponds to the metallic via. Even the single row, i.e. a one-dimensional array, has the effect of the above left handed metamaterial. The plurality of conductive cells 17 may be arranged two-dimensionally along the direction A1 as well as the direction A2, as in the conductive cells 51 of FIG. 9. In that case, the plurality of conductive cells 17 disposed on the opposite side to the end face 12c in the direction A1 of the plurality of conductive cells 17 shown in the figure may be connected to the ground pattern 42 through the metallic via provided in the dielectric layer 121 similarly to the conductive cells 51 in FIG. 9.

In the present embodiment, a resonant circuit is constituted by the capacitance between adjacent conductive cells 17 and the inductance between each conductive cell 17 and the corresponding ground pad 31. The specific frequency mentioned above corresponds to a resonant frequency of the resonant circuit. The capacitance between the adjacent conductive cells 17 is mainly determined by the distance D1 between the adjacent conductive cells 17 and the length L2 of the respective conductive cell 17. The inductance between the respective conductive cell 17 and the corresponding ground pad 31 is mainly determined by the length L3 and the width W2 of the corresponding wiring portion 18.

As in this embodiment, the package 10A may include the electromagnetic wave shielding films 44. The electromagnetic wave shielding films 44 are provided on the end face 12c away from the first layer 12a and electrically connected to the ground pads 31. Each of the wiring portions 18 extends from the respective conductive cell 17 toward the corresponding electromagnetic wave shielding film 44 in the projection direction of the feedthrough 12 (direction A1), and electrically connects the respective conductive cell 17 and the corresponding electromagnetic wave shielding film 44. In this instance, a part of the electromagnetic wave noise that is going to enter the housing 11 through the feedthrough 12 can be shielded by the electromagnetic wave shielding films 44. In addition, the electromagnetic wave noise that is not sufficiently attenuated in the electromagnetic wave shielding films 44 can be attenuated by the above-described effect of the plurality of conductive cells 17. Therefore, the penetration of the electromagnetic wave noise into the optical receiver module 2 through the feedthrough 12 can be more effectively reduced. Electrical connections between the conductive cells 17 and the ground pads 31 can be easily realized by electrically connecting the electromagnetic wave shielding films 44 to the conductive cells 17 via the wiring portions 18.

As in the present embodiment, the package 10A may include the plurality of conductive cells 19 electrically connected to the ground pads 31. The plurality of conductive cells 19 are provided in the fourth layer 12e between the second layer 12b and the third layer 12d, and are arranged along the first layer 12a and the end wall 11bb at regular intervals from each other in the same manner as the plurality of conductive cells 17. In the fourth layer 12e, the plurality of wiring portions 20 are arranged in the same manner as the plurality of wiring portions 18. The plurality of conductive cells 19 are connected to the plurality of wiring portions 20 on a one-to-one basis, and are electrically connected to the ground pads 31. The plurality of wiring portions 20 may be connected to the ground pads 31 via the above-described electromagnetic wave shielding films 44. In this instance, the plurality of conductive cells 19 can configure the left handed metamaterial in the same manner as the plurality of conductive cells 17. Thus, the plurality of conductive cells 19 may attenuate the electromagnetic wave of specific frequency which is determined by the shape and arrangement of the plurality of conductive cells 19 (such as the spacing between the conductive cells 19) in their surrounding region. Therefore, the penetration of the electromagnetic wave noise into the optical receiver module 2 through the feedthrough 12 can be more effectively reduced.

In the present embodiment, as described above, a cut-off frequency for the electromagnetic wave noise can be changed to a desired value by adjusting the interval D1 between the adjacent conductive cells 17 and the length L2 of the respective conductive cells 17. At that time, if the distance D1 is increased, the number of the conductive cells 17 decreases correspondingly. Similar to a distributed-constant circuit used in the metamaterial of the present embodiment, the larger the number of the conductive cells 17 per unit length, the better the effect of reduction of the electromagnetic wave noise.

Figure 10A:
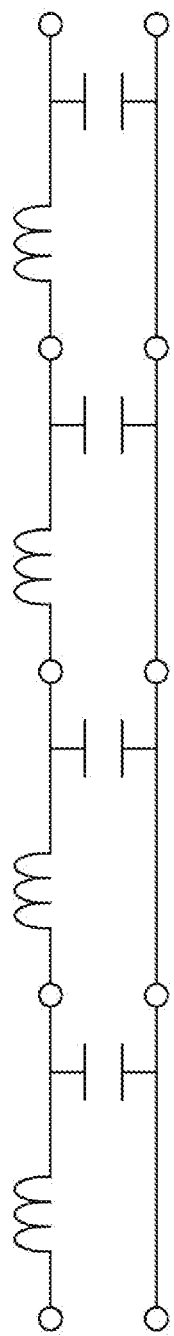
FIG. 10A is a circuit diagram showing a metamaterial realized by a plurality of conductive cells in a distributed-constant circuit manner
Figure 10B:
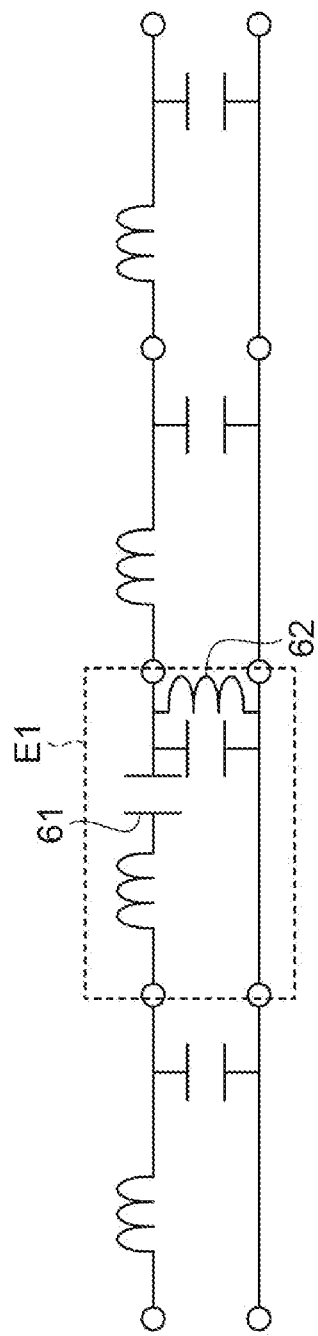
FIG. 10B is a circuit diagram showing a metamaterial realized by the plurality of conductive cells in a distributed-constant circuit manner

FIG. 10A and FIG. 10B are circuit diagrams in which the metamaterial realized by the plurality of conductive cells 17 are equivalently represented by distributed-constant circuits. FIG. 10A shows an ordinary transmission line equivalent circuit along the traveling direction of the electromagnetic wave. FIG. 10B shows a transmission line equivalent circuit when the metamaterial structure is placed in the middle. In FIG. 10B, a capacitance 61 and an inductance 62 corresponding to the metamaterial structure are added to a part E1 of the circuit in FIG. 10A.

EXAMPLES

Figure 11:
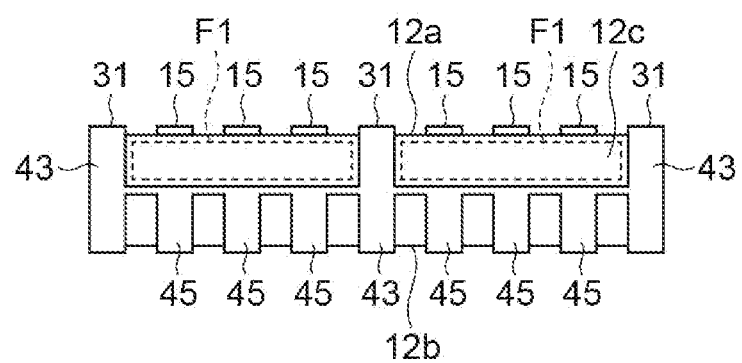
FIG. 11 shows a comparative example in which an electromagnetic wave shielding film and the plurality of conductive cells are not provided on an end face.
Figure 12:
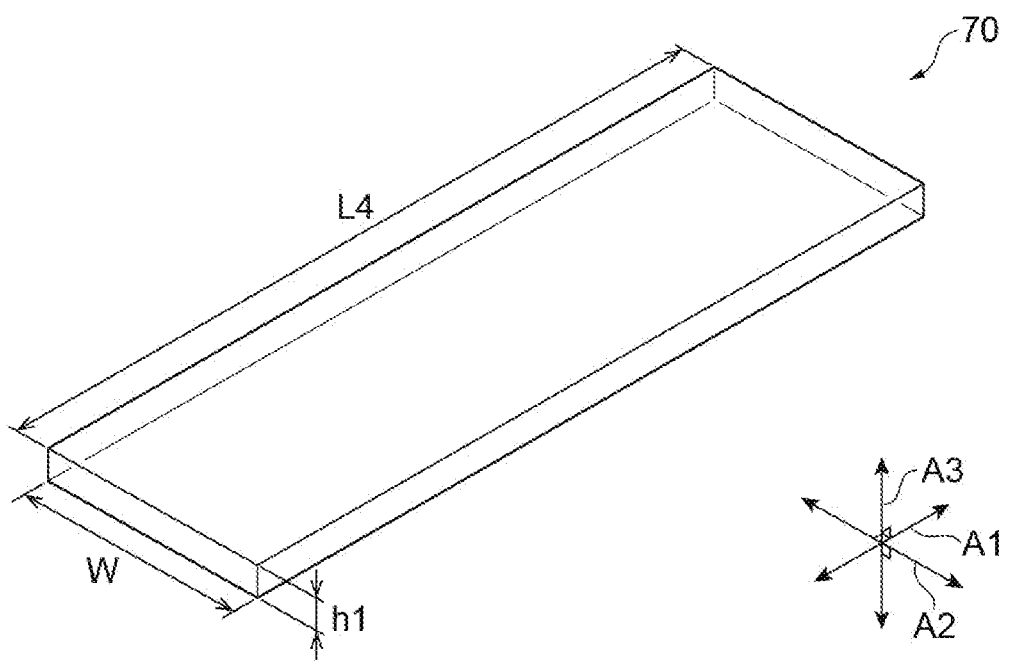
FIG. 12 is a perspective view showing a model of a waveguide in a portion indicated by dashed lines in FIG. 11.

In order to confirm the above-mentioned effect of the package 10A according to the above-mentioned embodiment, the inventors of the present disclosure conducted simulations using a computer. As a comparative example, FIG. 11 shows an end face 12c when the electromagnetic wave shielding films 44, the plurality of conductive cells 17, and the plurality of conductive cells 19 are not provided. In this case, the portion shown by the dashed line F1 in FIG. 11 is regarded as a waveguide consisting solely of dielectric material. FIG. 12 is a perspective view showing a waveguide 70 as a model of this waveguide. In this simulation, a width W of the waveguide 70 in the direction A2 (corresponding to the length L1 of FIG. 4) is 6.2 mm and a height h1 is 0.852 mm. It is assumed that the inside of the waveguide 70 is filled with alumina. The relative permittivity $\varepsilon_r$ of alumina is 9.2, and the dielectric tangent, tan $\delta$, of alumina is 0.008. The length L4 of the waveguide 70 in a guiding direction (direction A1) is 20 mm. The guiding direction is a direction toward the interior space from the end face 12c.

Figure 13:
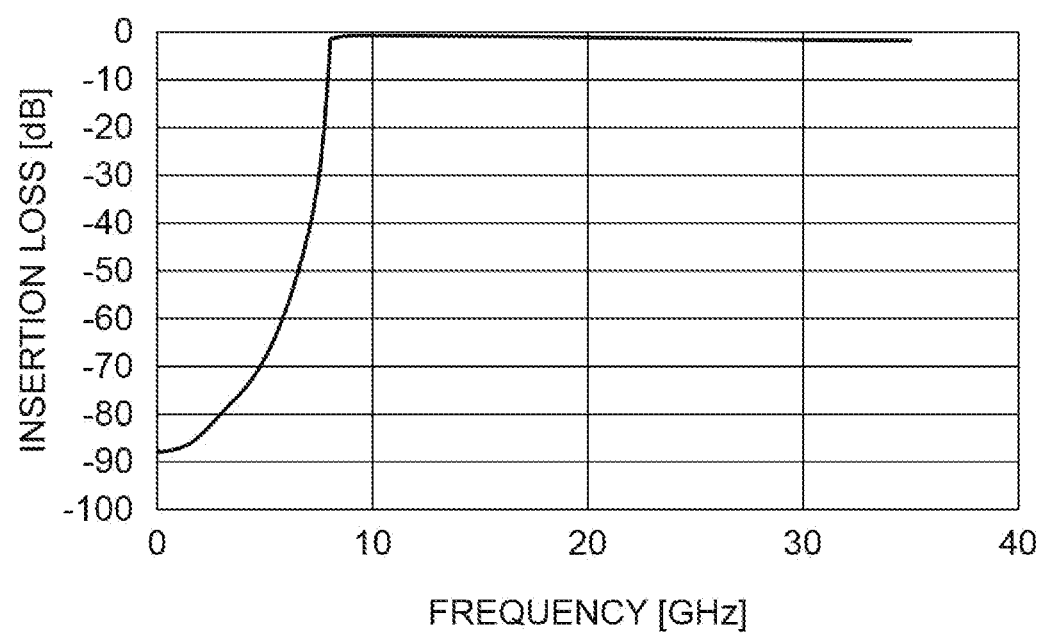
FIG. 13 is a graph showing a relationship between insertion loss of the waveguide shown in FIG. 12 and frequency of electromagnetic wave.

When the calculation is made focusing only on TE10 mode in the guiding direction, the relationship between an insertion loss of the waveguide 70 and the frequency of the electromagnetic wave became as the graph shown in FIG. 13. The cut-off frequency at which the insertion loss is effective became about 9 GHz. Therefore, the electromagnetic wave noise with frequencies higher than 9 GHz propagates in the waveguide 70 without attenuation in the guiding direction. For example, the transmission speed used in 100 GBASE LR4 and the like is 25 Gbits/s. In this case, the electromagnetic wave noise emitted by the drive signal with a fundamental frequency of 25.78125 GHz can then easily propagate in this waveguide. From the results of the calculations, it is understood that in order to cut off the electromagnetic wave noise of the fundamental frequency of 25.78125 GHz when the transmission speed is 25 Gbits/s down to, for example, −30 dB, the width W should theoretically be 1.9 mm or less. However, since the feedthrough 12 in real does not has a perfect waveguide construction, it is desirable to set the width being sufficiently short compared to the wavelength of the electromagnetic wave noise, e.g., less than ¼ of 1.9 mm. Since the first layer 12a is provided with the plurality of DC pads 15 arranged side by side, it is difficult to set the width W of the waveguide to such a value.

Figure 14:
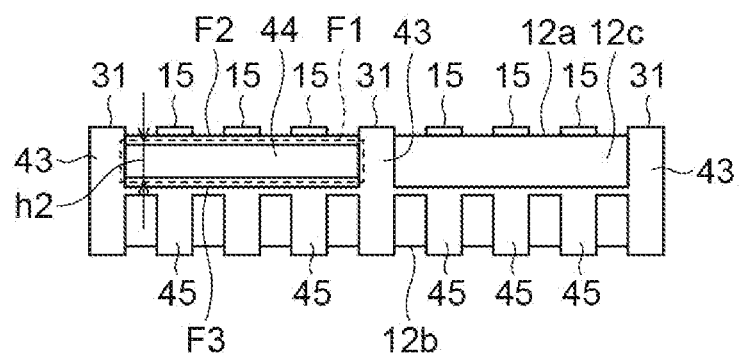
FIG. 14 shows another comparative example in which only the electromagnetic wave shielding film is provided on the end face shown in FIG. 11.
Figure 15:
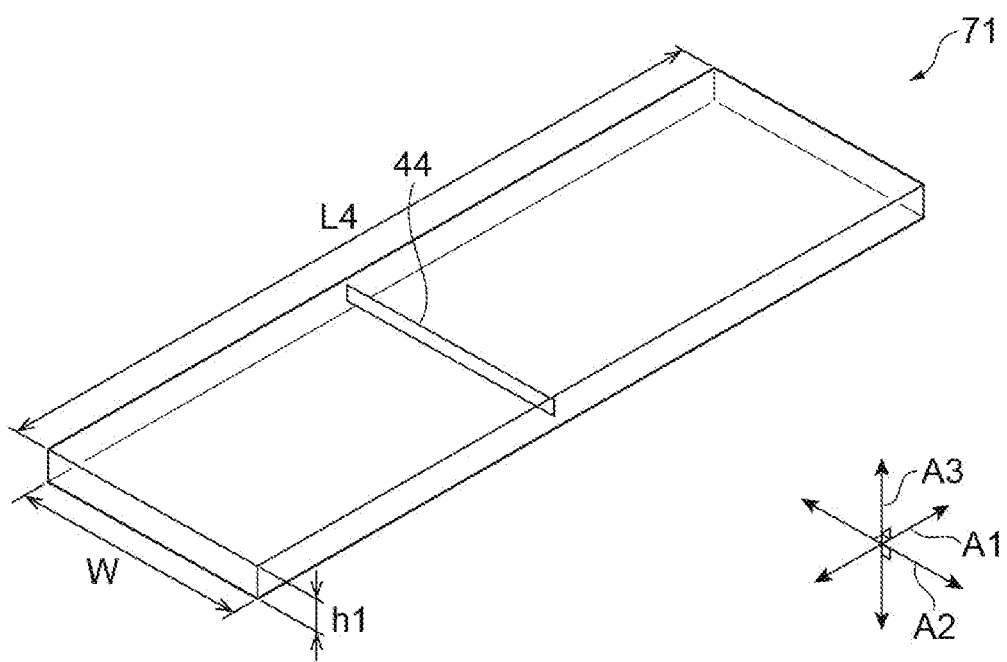
FIG. 15 is a perspective view showing a model of a portion of a waveguide indicated by dashed lines in FIG. 14.
Figure 16:
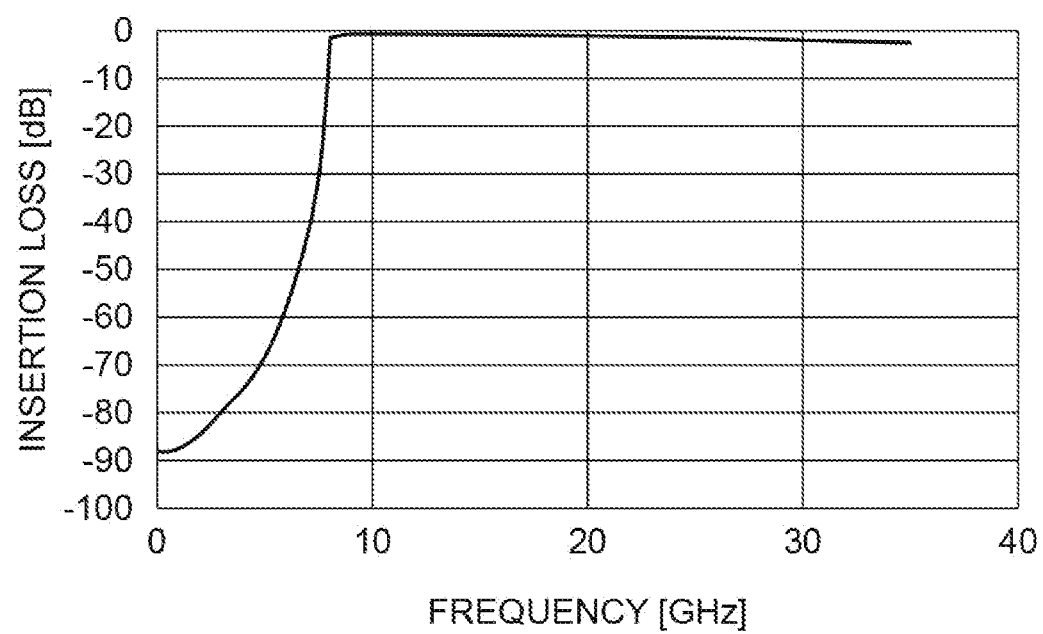
FIG. 16 is a graph showing a relationship between insertion loss of the waveguide shown in FIG. 15 and frequency of electromagnetic wave.

FIG. 14 shows another comparative example in which only the electromagnetic wave shielding film 44 is provided on the end face 12c shown in FIG. 11. A gap F2 is provided between the electromagnetic wave shielding film 44 and a top surface of the waveguide. A gap F3 is provided between the electromagnetic wave shielding film 44 and a bottom surface of the waveguide. FIG. 15 is a perspective view showing a waveguide 71 as a model of the waveguide of a portion shown by the dashed line F1 in FIG. 14. In the present simulations, a width of the electromagnetic wave shielding film 44 in the direction A2 is set to be the same as the width W of the waveguide 71 (6.2 mm), and a height h2 of the electromagnetic wave shielding film 44 (the width in the direction A3) is set to be 0.47 mm. FIG. 16 is a graph showing the relationship between the insertion loss and the frequency of the electromagnetic wave for the waveguide shown in FIG. 15. Referring to FIG. 16, the graph shows almost no change with respect to the graph shown in FIG. 13, and it is understood that the effect of shielding the electromagnetic wave noise is insufficient only with the electromagnetic wave shielding film 44.

Figure 17:
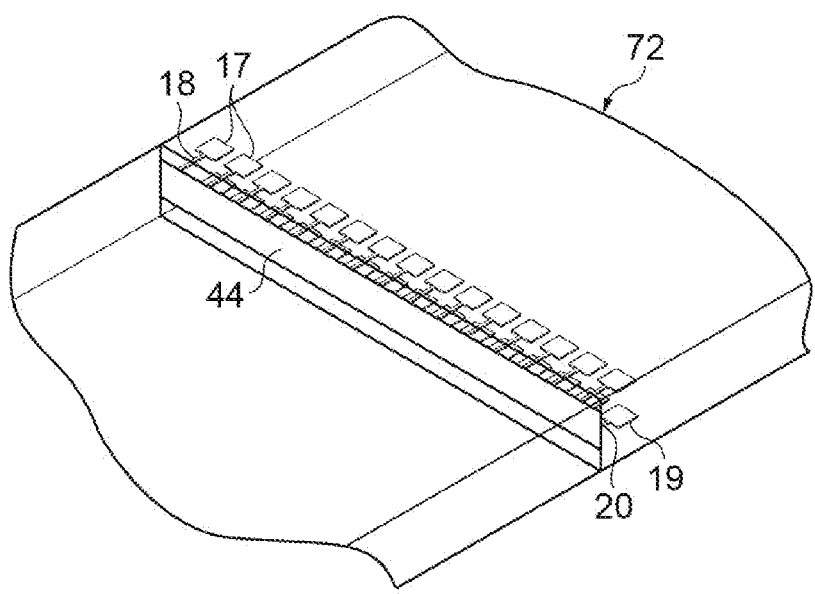
FIG. 17 is a perspective view showing a waveguide configuration in which the plurality of conductive cells and wiring portions are added to the configuration shown in FIG. 14.
Figure 18:
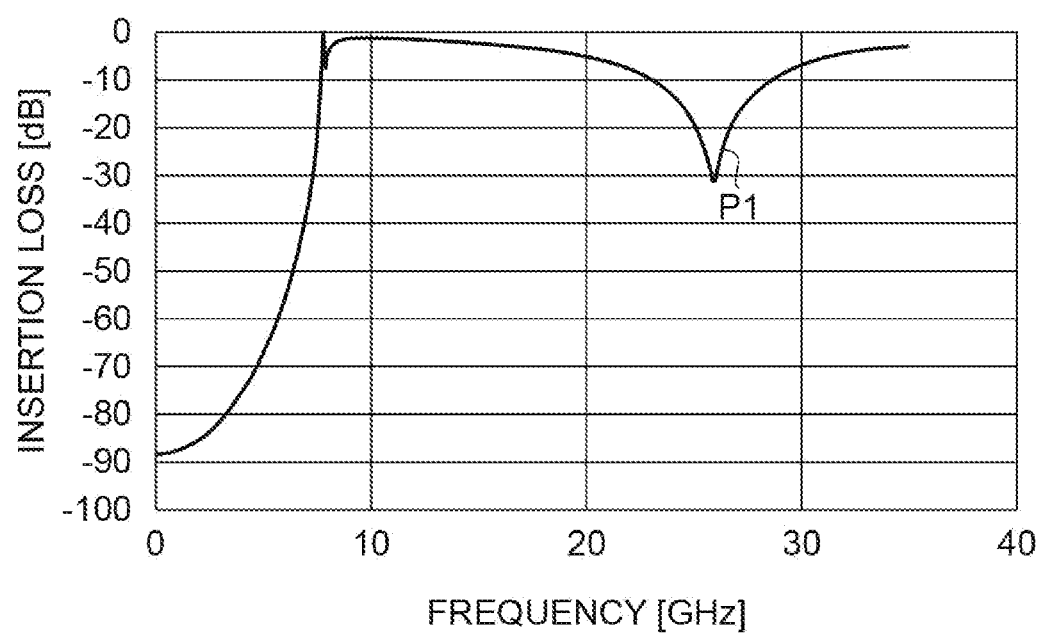
FIG. 18 is a graph showing a relationship between insertion loss of the waveguide shown in FIG. 17 and frequency of electromagnetic wave.

FIG. 17 is a perspective view showing a construction of a waveguide 72 in a form in which the plurality of conductive cells 17 and the plurality of wiring portions 18 are added to the construction shown in FIG. 14, that is, the above embodiment. In the present simulations, the width W1 and the length L2 of the respective conductive cells 17 shown in FIG. 6 are both 0.2745 mm, the width W2 of the respective wiring portions 18 is 0.033 mm, and the length L3 is 0.35 mm. In addition, the distance D1 between adjacent conductive cells 17 is set to 0.13 mm. The same applies to the conductive pads 19 and the wiring portions 20. FIG. 18 is a graph showing the relationship between the insertion loss and the frequency of the electromagnetic wave for the waveguide shown in FIG. 17. Compared to FIG. 13 and FIG. 16, it can be seen that a peak P1 at which an absolute value of the insertion loss is increased appears in the vicinity of the frequency 25 GHz. That is, according to the above-described embodiment, it is possible to effectively reduce the intrusion of the electromagnetic wave noise into the housing of the optical receiver module 2 by attenuating the electromagnetic wave noise in the vicinity of a desired frequency in the feedthrough 12.

First Modification

Figure 19:
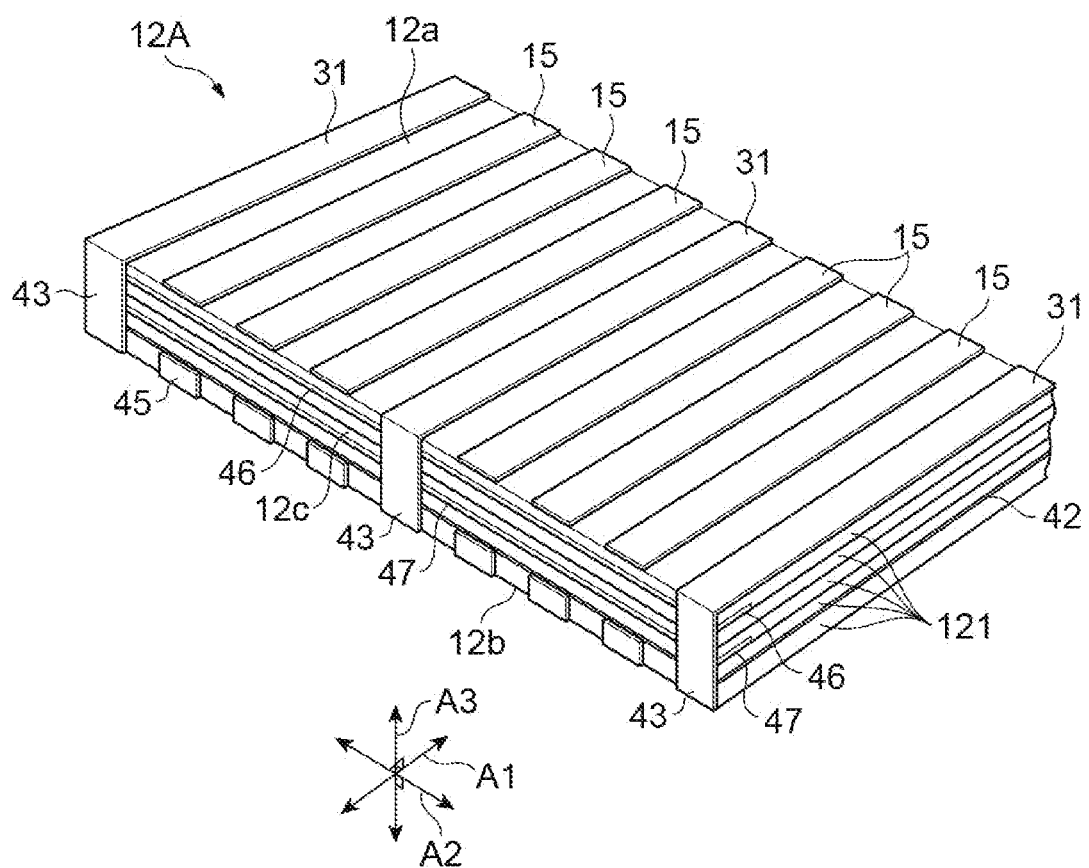
FIG. 19 is a perspective view showing a feedthrough as a first modification.
Figure 20:
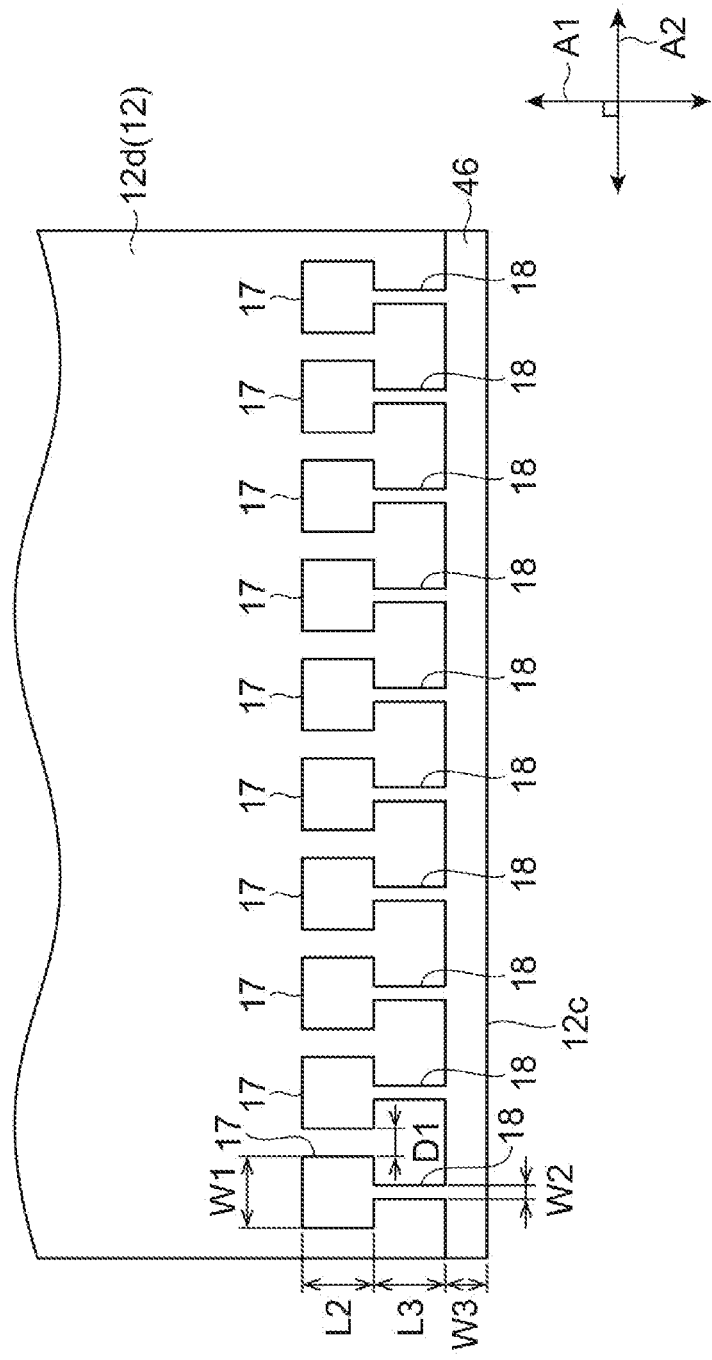
FIG. 20 is a plan view showing a third layer of the feedthrough of the first modification.
Figure 21:
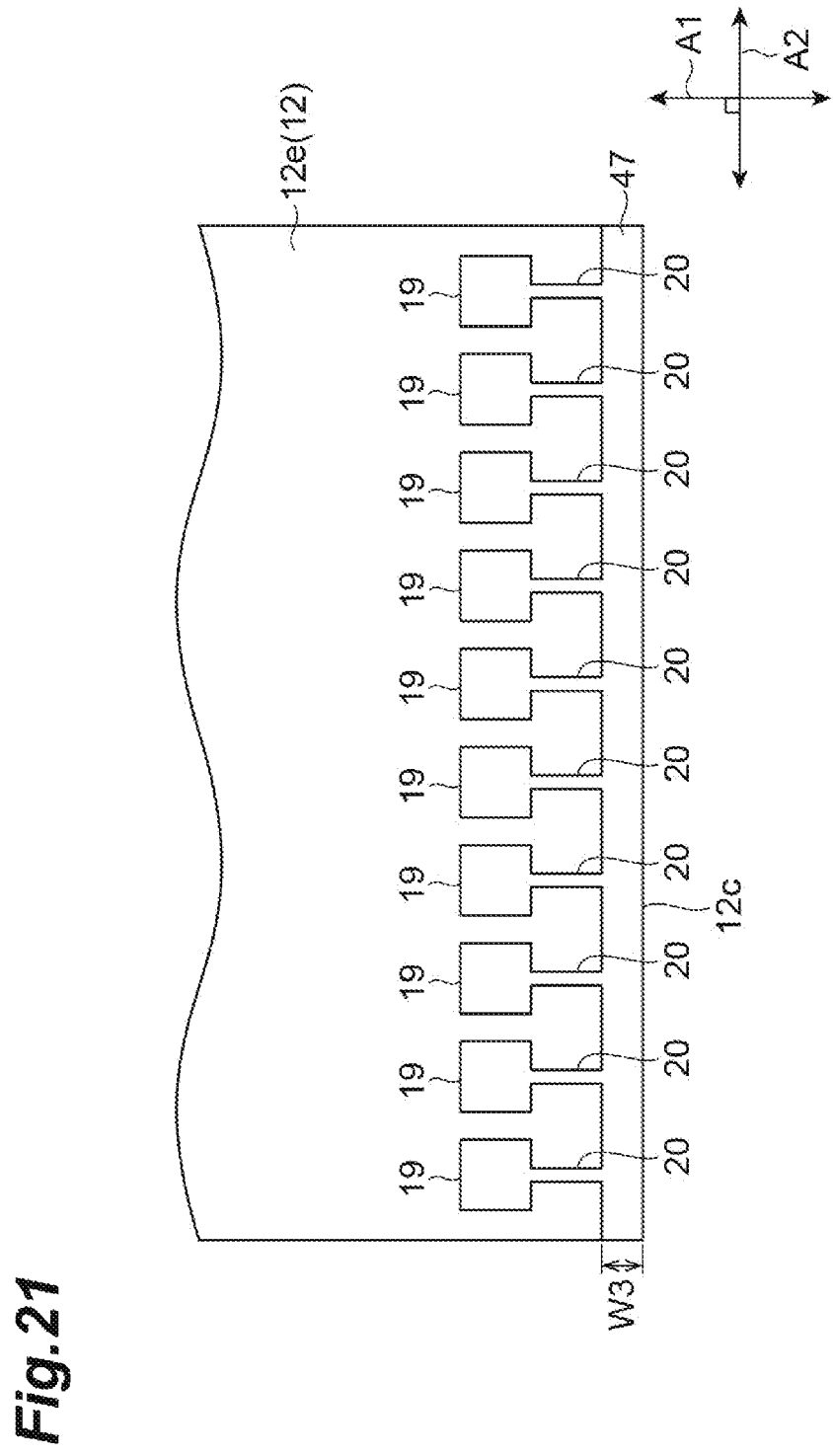
FIG. 21 is a plan view showing a fourth layer of the feedthrough of the first modification.

FIG. 19 is a perspective view showing a feedthrough 12A as a first modification of the above embodiment. Also, FIG. 20 and FIG. 21 are plan views showing the third layer 12d and the fourth layer 12e of the feedthrough 12A of the present modification, respectively. This modification has two differences compared to the above embodiment. First point is that the electromagnetic wave shielding film 44 is not provided on the feedthrough 12A. Second point is that the feedthrough 12A has a conductive pattern 46 on the third layer 12d and a conductive pattern 47 on the fourth layer 12e.

The conductive pattern 46 is a metallic film embedded between the dielectric layers 121 in the third layer 12d. The conductive pattern 47 is a metallic film embedded between the dielectric layers 121 in the fourth layer 12e. The conductive patterns 46 and 47 extend along the direction A2 from one side of the feedthrough 12A to the other side. The conductive patterns 46 and 47 are electrically connected to each other, for example, via metal films additionally formed on both sides of the feedthrough 12A. The conductive patterns 46 and 47 are exposed from the dielectric layers 121 at the end face 12c of the feedthrough 12A and are in contact with the electromagnetic wave shielding films 43. Accordingly, the conductive patterns 46 and 47 are electrically connected to the ground pads 31 via the electromagnetic wave shielding films 43, and are regulated to the reference potential. For example, a width W3 in the direction A1 of the conductive patterns 46 and 47 may be set to be the same as the height h2 of the electromagnetic wave shielding films 44 in the direction A3 in the example described above. The width W3 is, for example, 0.47 mm.

As shown in FIG. 20, each wiring portion 18 extends along the direction A1 from the corresponding conductive cell 17 toward the conductive pattern 46. An end of each wiring portion 18 opposite the corresponding conductive cell 17 is connected to the conductive pattern 46. Thus, each wiring portion 18 electrically connects the corresponding conductive cell 17 and the conductive pattern 46. Therefore, the conductive cells 17 are electrically connected to the ground pads 31 via the conductive pattern 46 and the electromagnetic wave shielding films 43, and are defined to the reference potential. Similarly, as shown in FIG. 21, each wiring portion 20 extends along the direction A1 from the corresponding conductive cell 19 toward the conductive pattern 47. An end of each wiring portion 20 opposite the corresponding conductive cell 19 is connected to the conductive pattern 47. Thus, each wiring portion 20 electrically connects the corresponding conductive cell 19 and the conductive pattern 47. Therefore, the conductive cells 19 are electrically connected to the ground pads 31 and the ground pattern 42 via the conductive pattern 47 and the electromagnetic wave shielding films 43, and are defined to the reference potential.

The configuration for electrically connecting the wiring portions 18 and 20 to the ground pads 31 is not limited to the above embodiment, and various modifications like this modification may be adopted. In any configurations, the conductive cells 17 and 19 are electrically connected to the ground pads 31, so that the same operation and effect as in the above embodiment can be achieved. In addition, according to the present modification, it is possible to easily realize the electric connections between the plurality of conductive cells 17 and 19 and the ground pads 31.

Second Modification

Figure 22:
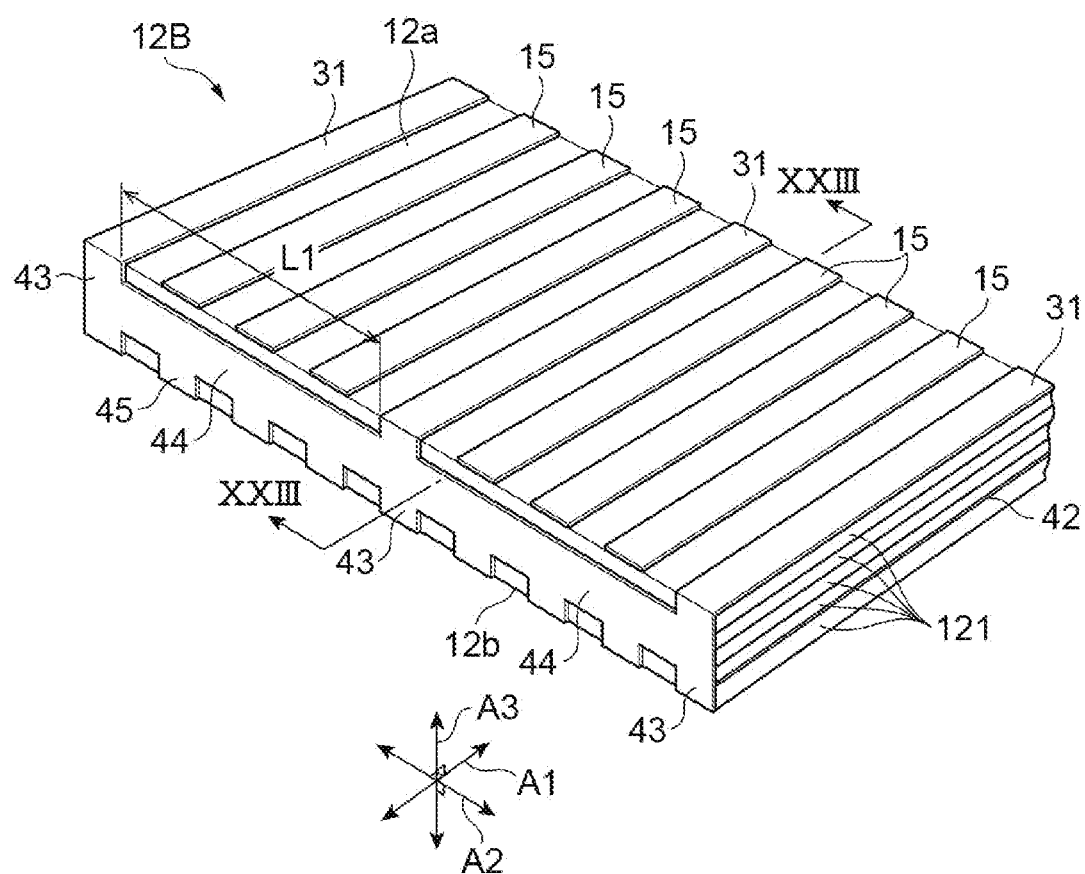
FIG. 22 is a perspective view showing a feedthrough as a second modification.

FIG. 22 is a perspective view showing a feedthrough 12B as a second modification of the above embodiment. FIG. 23 is a cross-sectional view taken along XXIII-XXIII line of FIG. 22. The difference between the present modification and the above embodiment is that the electromagnetic wave shielding films 44 of the feedthrough 12B extend to the ground pattern 42 and are connected to the ground pattern 42. Since there is no electromagnetic gap between the ground pattern 42 and the electromagnetic wave shielding films 44, the electromagnetic wave noise can be shielded more effectively than in the above embodiment. In this instance, the plurality of conductive cells 19 and the plurality of wiring portions 20 shown in FIG. 7 may be omitted.

The package for an optical receiver module and the optical receiver module according to the present disclosure are not limited to the embodiments and modifications described above, and various other modifications are possible. For example, although the plurality of conductive cells 19 and the plurality of wiring portions 20 are provided in the fourth layer 12e in the above embodiment, the plurality of conductive cells 19 and the plurality of wiring portions 20 may be omitted in the case where the gap between the electromagnetic wave shielding films 44 and the ground pattern 42 can be shielded by other means as in the second modification, or in the case where the distance between the first layer 12a and the ground pattern 42 is short in the first modification, for example. In the above embodiment, the conductive cells 17, 19 are electrically connected to the ground pads 31 via the ground pattern 42, other elements such as a via-hole penetrating the dielectric layer 121 may be applicable to electrically connect the conductive cells 17, 19 to the ground pads 31 and the ground pattern 42. In the above embodiment, the conductive cells 17, 19 are electrically connected to the ground pads 31 on the first layer 12a and the ground pads 16c on the second layer 12b, but the conductive cells 17, 19 may be connected to at least one of them.

What is claimed is:

1. A package for optical receiver module comprising:
   a conductive housing having a first sidewall, a second sidewall, and an interior space, the first sidewall being provided with an optical port configured to receive an optical signal along an optical axis, the second sidewall being separated from the first sidewall in a direction of the optical axis, the interior space being defined between the first sidewall and the second sidewall, the interior space being configured to house a photodetector which converts the optical signal into an electrical signal; and
   a feedthrough having a first layer, a second layer, and a third layer, the first layer and the second layer extending from the second sidewall to an opposite side of the first sidewall, the third layer being disposed between the first layer and the second layer, the feedthrough including
   a dielectric material,
   a plurality of first wirings having at least one of a monitor wiring or a power wiring, the plurality of the first wirings being configured to face the interior space,
   a second wiring being configured to face the interior space and configured to transmit the electrical signal,
   a plurality of third wirings formed in the first layer, the plurality of the third wirings being arranged along a side direction crossing the optical axis, the plurality of the third wirings being electrically connected to the plurality of the first wirings,
   a fourth wiring formed in the second layer, the fourth wiring being electrically connected to the second wiring and configured to transmit the electrical signal transmitted by the second wiring,
   a grounding wiring formed in either of the first layer or the second layer, and
   a plurality of first conductive cells formed in the third layer, the plurality of the first conductive cells being arranged along the side direction, each of the plurality of the first conductive cells being equally spaced,
   wherein the plurality of the first conductive cells are electrically connected to the grounding wiring.

2. The package for optical receiver module according to claim 1, wherein
   the feedthrough has an end face on one end in the direction of the optical axis, and the end face connects the first layer and the second layer,
   the feedthrough has a first shielding film disposed on the end face, the first shielding film being disposed apart from the first layer, the first shielding film being electrically connected to the grounding wiring,
   the feedthrough has a plurality of wiring portions disposed in the third layer, the plurality of the wiring portions electrically connecting the plurality of the first conductive cells and the first shielding film.

3. The package for optical receiver module according to claim 2, wherein
   each of the plurality of the wiring portions has a width in the side direction smaller than a width in the side direction of each of the plurality of the first conductive cells.

4. The package for optical receiver module according to claim 1, wherein
   the feedthrough has a conductive pattern disposed in the third layer and extending along the side direction, the conductive pattern being electrically connected to the grounding wiring,
   the feedthrough has a plurality of wiring portions disposed in the third layer, the plurality of the wiring portions electrically connecting the plurality of the first conductive cells and the conductive pattern.

5. The package for optical receiver module according to claim 4, wherein
   each of the plurality of the wiring portions has a width in the side direction smaller than a width in the side direction of each of the plurality of the first conductive cells.

6. The package for optical receiver module according to claim 1, wherein
   the feedthrough has a fourth layer located between the second layer and the third layer, the feedthrough has a plurality of second conductive cells formed in the fourth layer, the plurality of the second conductive cells being arranged along the side direction and being equally spaced, and the plurality of the second conductive cells are electrically connected to the grounding wiring.

7. The package for optical receiver module according to claim 6, wherein the feedthrough has a conductive pattern disposed in the fourth layer and extending along the side direction, the conductive pattern being electrically connected to the grounding wiring, the feedthrough has a plurality of wiring portions disposed in the fourth layer, the plurality of the wiring portions electrically connecting the plurality of the first conductive cells and the conductive pattern.

8. The package for optical receiver module according to claim 7, wherein each of the plurality of the wiring portions has a width in the side direction smaller than a width in the side direction of each of the plurality of the second conductive cells.

9. The package for optical receiver module according to claim 1, wherein the feedthrough has a dielectric layer disposed between the first layer and the third layer.

10. The package for optical receiver module according to claim 1, wherein the feedthrough has a dielectric layer disposed between the second layer and the third layer.

11. An optical receiver module comprising:

a package including a conductive housing having a first sidewall, a second sidewall, and an interior space, the first sidewall being provided with an optical port configured to receive an optical signal along an optical axis, the second sidewall being separated from the first sidewall in a direction of the optical axis, the interior space being defined between the first sidewall and the second sidewall, and a feedthrough having a first layer, a second layer, and a third layer, the first layer and the second layer extending from the second sidewall to an opposite side of the first sidewall, the third layer being disposed between the first layer and the second layer, the feedthrough including, a dielectric material, a plurality of first wirings having at least one of a monitor wiring or a power wiring, the plurality of the first wirings being configured to face the interior space, a second wiring being configured to face the interior space and configured to transmit an electrical signal, a plurality of third wirings formed in the first layer, the plurality of the third wirings being arranged along a side direction crossing the optical axis, the plurality of the third wirings being electrically connected to the plurality of the first wirings, a fourth wiring formed in the second layer, the fourth wiring being electrically connected to the second wiring and configured to transmit the electrical signal transmitted by the second wiring, a grounding wiring formed in either of the first layer or the second layer, and a plurality of first conductive cells formed in the third layer, the plurality of the first conductive cells being arranged along the side direction, each of the plurality of the first conductive cells being equally spaced; and a photodetector disposed in the the interior space, the photodetector converting the optical signal into the electrical signal, wherein the plurality of the first conductive cells are electrically connected to the grounding wiring.

\* \* \* \* \*